United States Patent
Yoshida

(10) Patent No.: US 9,262,944 B2
(45) Date of Patent: Feb. 16, 2016

(54) CURVILINEAR SOLID FOR INFORMATION INPUT, MAP FOR INFORMATION INPUT, DRAWING FOR INFORMATION INPUT

(76) Inventor: Kenji Yoshida, Tokyo (JP)

( * ) Notice: Subject to any disclaimer, the term of this patent is extended or adjusted under 35 U.S.C. 154(b) by 771 days.

(21) Appl. No.: 13/520,587

(22) PCT Filed: Jan. 5, 2011

(86) PCT No.: PCT/JP2011/050046
§ 371 (c)(1),
(2), (4) Date: Sep. 7, 2012

(87) PCT Pub. No.: WO2011/083799
PCT Pub. Date: Jul. 14, 2011

(65) Prior Publication Data
US 2012/0320425 A1 Dec. 20, 2012

(30) Foreign Application Priority Data
Jan. 6, 2010 (JP) .................... 2010-001589

(51) Int. Cl.
*G06K 19/06* (2006.01)
*G09B 27/02* (2006.01)
*G09B 29/10* (2006.01)

(52) U.S. Cl.
CPC .............. *G09B 27/02* (2013.01); *G09B 29/10* (2013.01)

(58) Field of Classification Search
USPC ....................................... 235/494
See application file for complete search history.

(56) References Cited

U.S. PATENT DOCUMENTS

| | | | | |
|---|---|---|---|---|
| 4,263,504 A * | 4/1981 | Thomas | ........... | G06K 19/06037 235/454 |
| 6,732,927 B2 * | 5/2004 | Olsson | .................. | G06F 3/0317 235/454 |
| 7,967,217 B2 * | 6/2011 | Yoshida | ................ | G06F 3/0317 235/494 |
| 8,928,779 B2 * | 1/2015 | Takenaka | ............... | H04N 5/335 250/394 |
| 2010/0265520 A1 | 10/2010 | Yoshida | | |

FOREIGN PATENT DOCUMENTS

| | | |
|---|---|---|
| EP | 11731797.4 | 10/2015 |
| JP | 2006003791 | 1/2006 |
| JP | 2006043093 | 2/2006 |

(Continued)

OTHER PUBLICATIONS

Supplementary European Search Report and the European Search Opinion (pp. 1-5) of corresponding European patent application No. 11731797.4 (PCT/JP2011/050046) dated Oct. 10, 2015.

*Primary Examiner* — Daniel Hess
(74) *Attorney, Agent, or Firm* — Duane Morris LLP

(57) ABSTRACT

Problems of dot pattern technology include latitude/longitude information not being able to be acquired from a curvilinear solid. To read coordinate and/or code information from the vicinity of a line segment to acquire information associated with the line segment, it is necessary to define manually an area including the line segment to form the dot-pattern associated with the information in the area. In the case where line segments are adjacent, a sufficient area cannot be secured and information cannot be defined accurately for the line segment. Stream dot-patterns which are formed based on a prescribed rule, and which have few moires that are streaky periodic patterns are connected and formed in a belt-like shape. It becomes possible to create an information inputting medium that accurately defines the latitude/longitude and coordinate information on various line segments on the curvilinear solid, the map, the drawing, or the like.

16 Claims, 26 Drawing Sheets

(56) References Cited

FOREIGN PATENT DOCUMENTS

| | | |
|---|---|---|
| JP | 2008225732 | 9/2008 |
| JP | 2009163354 | 7/2009 |
| WO | WO2006076203 | 7/2006 |
| WO | WO2007004994 | 1/2007 |
| WO | 2007-032747 A2 | 3/2007 |

* cited by examiner

POSITION WHERE REFERENCE DOT IS
TO BE ARRANGED ORIGINALLY (a)

(b)

(a)

(b)

(a)

(b)

CURVILINEAR SOLID FOR INFORMATION INPUT, MAP FOR INFORMATION INPUT, DRAWING FOR INFORMATION INPUT

CROSS REFERENCE TO RELATED APPLICATIONS

The present application is a U.S. national stage application under 35 U.S.C. §371 of International Patent Application No. PCT/JP2010/050046, filed Jan. 5, 2011, which claims priority to JP 2010-001589 filed on Jan. 6, 2010, 2009, the entirety of which in incorporated by reference herein.

TECHNICAL FIELD

The present invention relates to a curvilinear solid, map and drawing for information input using a dot-pattern capable of making various information inputted/outputted by reading optically dot-pattern information formed on a medium, and in particular, relates to a technology by which a plurality of stream dot-patterns are connected to be formed in a belt-like shape on the surfaces thereof.

BACKGROUND ART

Conventionally, a technology where when any places on a terrestrial globe with a map printed on as visible information are pointed by a directing means, invisible information printed on the visible information in an overlapped manner are read, and based on the read invisible information, information with respect to the part pointed at is made to be output in a voice, has been proposed (refer to Patent document 1).

In addition, a technology where in a medium where visible information and a dot-pattern are printed on a map in a superimposed manner, the dot-pattern where code information and coordinate information are combined has been printed within the dot-pattern, and from the code information of a symbol on the map, a descriptive text, an image or the like of the symbol are outputted through a display device or a loudspeaker, and from the coordinate information on the map and said symbol, a map image corresponding thereto is made to be outputted from the display device, has been proposed (refer to Patent document 2).

PRIOR ART DOCUMENT

Patent Documents

Patent document 1: Japanese patent Laid Open No. 2006-43093 TAKARA
Patent document 2: Japanese patent Laid Open No. 2007-079993 YOSHIDA

DISCLOSURE OF THE INVENTION

Problems to be Solved by the Invention

However, there has been a problem that even if dot-pattern technologies described in any of Patent documents 1 or 2 are adopted, since the conventional dot-patterns are what are formed with dots arranged based on a number and interval determined in advance within an area of a block, in the case where information is defined, for example, on a curvilinear solid including a terrestrial globe based on the dot-pattern, a distortion arises in dots in a joint part (for example, a part where spindle-formed paper is glued together), or between a central part (for example, the vicinity of the equator) and a polar zone (for example, the vicinity of the North Pole), and it is difficult, in that part, to form and read the dot-pattern appropriately.

Therefore, there has been a problem that even if dot-pattern technologies proposed by these plurality of inventors (Patent documents 1 and 2) are used, when information is defined on a curvilinear solid such as a terrestrial globe, only a method in which code information is defined by forming the same dot-pattern for every prescribed area in the unit of a country, a region and a city, such as Tokyo, Burgundy and the United States, and in which the information corresponding thereto is made to be inputted/outputted, is adopted, and latitude/longitude information and information associated with the latitude/longitude information on the terrestrial globe can not be acquired, and there has been an unsolvable problem that from that, resulting from this, an exact position pointed by a directing means cannot be specified, realization of a dot-pattern technology which is rich in convenience is difficult. Therefore, with a conventional dot-pattern arranged on a two-dimensional plane, it has been difficult to acquire information from any position of a curvilinear solid.

In addition, in order to read coordinate information and/or code information by an optical read means from the vicinity of a line segment drawn on a map and drawing to acquire information associated with the line segment, it is necessary to define manually an area including the line segment to form a dot-pattern associated with the information in the area. There is a problem that a labor/time/cost for that have become huge, and furthermore, in the case where line segments are adjacent, a sufficient area can not be secured, and information cannot be defined accurately for the line segment.

In addition, in the above-mentioned Patent document 1, there is a problem that since a complicated and regular dot-pattern has been formed on a medium, a part in which a dot is formed and a part in which a dot is not formed interfere with each other, and a moire which is a streaky periodic pattern is generated.

The present invention is accomplished in view of above points, and the technical subject is to create a information inputting medium with which an accurate coordinate information can be defined on all medium surfaces such as a curvilinear solid, a map and a drawing or the like by that a plurality of stream dot-patterns having few moires that are streaky periodic patterns, which are formed based on a prescribed rule on medium surfaces such a curvilinear solid including a terrestrial globe, a map and a drawing or the like, are connected to be formed in a belt-like shape, and by that coordinate information and a plurality of information indicating a position on a curvilinear solid, a map and a drawing are defined based on the stream dot-pattern, and by that the stream dot-patterns formed on the medium surfaces are read by an optical read means, and information thereof and associated information are made to be inputted/outputted.

Means for Solving the Problems

In order to dissolve said problems, the following means are adopted in the present invention.

A curvilinear solid for information input of the present invention is the curvilinear solid where a dot-pattern in which dots are arranged based on a prescribed rule is formed on the surface thereof, and the dot-pattern is a stream dot-pattern comprising: a plurality of reference dots arranged contiguously in a line form; a first virtual reference line which connects the plurality of reference dots, and which is comprised of a straight line, a polygonal line and/or a curved line; a second virtual reference line which is defined on a prescribed position from the reference dot and/or the first virtual reference line, and is comprised of a straight line and/or a curved line; a plurality of virtual reference points provided on a prescribed position on the second virtual reference line; an information dot where information is defined based on a distance and a direction from the virtual reference point, and the plurality of stream dot-patterns are connected and formed in a belt-like shape on a surface of the curvilinear solid, and coordinate information and/or code information indicating a position on a curvilinear solid are defined based on a prescribed rule of the dot, and when an arbitrary position on the curvilinear solid is imaged by an optical read means, the coordinate information and/or code information of the imaging center are read.

That is, in the present invention, on all the curvilinear solids including a terrestrial globe, a plastic model, a design model, and a human body model, a plurality of stream dot-patterns on which coordinate information and/or code information which indicate a prescribed position on the curvilinear solid are defined are connected and provided in a belt-like shape based on a prescribed rule.

Since a plurality of dot-patterns are made to be connected and are provided in a belt-like shape, an interval of a definite information aggregation defined based on a prescribed rule of the dot-pattern is expanded/compressed based on a length of the circumference or the like of the curvilinear solid, and the length of the definite information aggregation can be adjusted as a design matter.

Thereby, a distortion of the dot-pattern which arises when the dot-pattern is formed and an error at a joint part of a final part which arises in the circumferential direction can be dissolved, and it becomes possible to identify dots even if any area is read.

In the same way, the length of the definite information aggregation is averaged and derived from the length of the circumference of the curvilinear solid, and thereby, a decrease of an amount of information and a distortion of the dot-pattern to the extent of being unable to be analyzed by a processing means which are caused by that an interval, a size and number of the dots differ from other continuous dot-patterns in the vicinity of the final part, can be prevented, and it becomes possible to define coordinate information and/or code information based on the dot-pattern formed on the curvilinear solid.

Here, an area in which expansion/compression or the like of the dot-pattern are possible, in an optical read means of which an imaging area is about 4 mm in diameter, is up to the minimum value where analyzing an imaged image data is guaranteed, and a width and length of the definite information aggregation are about 1 to 3 mm. As a matter of course, it is needless to say that the length and width of the definite information aggregation can be increased and decreased depending on the size of the imaging area.

Besides, it is possible to carry out the adjustment not only this, but also by modifying a position of a dot, and the prescribed interval and the number of the dots in the definite information aggregation, that is, by making it a variable length. The size of the amount of information in the case of adopting the variable length, if it is within the limit analyzable by a processing means, becomes possible to deal with various data which are large and small.

In addition, since the dot-pattern is formed in a belt-like shape, it becomes possible to define a prescribed position of the curvilinear solid of which a radius is not constant, which has been difficult in a conventional dot-pattern. Besides, the curvilinear solid includes also a free sculptured surface body such as a spherical body, a circular cylinder and a circular cone, which can not be expressed with a simple formula. In this case, several points of intersection and curvatures are configured in a space, and each points of intersection will be complemented to express a curved surface with an equation of higher degree.

Then, the dot-pattern provided on the curvilinear solid is read as image data using an optical read means, and the image data are analyzed, and the mutual position and distance between dots are analyzed, and thereby, by identifying the dot-pattern as the dots arranged based on a prescribed rule, the dot-pattern is analyzed to be able to calculate coordinate information and/or code information from the dot code.

According to said configuration, in accordance with a request from a information input person, it becomes possible to define various information associated with coordinate information indicating a prescribed position on the curvilinear solid, and the code information by determining an arbitrarily area on the curvilinear solid, and to allocate the associated information. That is, since the dots where the coordinate information of the curvilinear solid and the code information are combined are arranged in the dot-pattern, in the case where the medium is a human body model for example, from the code information defined on the area of a symbol printed on the human body model, a descriptive text, an image, a moving image, an advertisement, voice information, a web or the like which indicate parts of the human body can be outputted from a display device, a loudspeaker, or the like, and from the coordinate information of the human body model, the information which changes for every coordinate positions, such as body temperature, will be able to be calculated from a measurement value or a prescribed equation.

By using a stream dot-pattern, without depending on a shape of a rectangular area in a conventional dot-pattern, it becomes possible to print and form the dot-pattern on a medium surface in a form of a line including a curved line, and by reading optically the dot-pattern information formed on the medium, it becomes possible to make various information inputted/outputted on the curvilinear solid on which a drawing and map, a character and a symbol and a figure, or the like are formed.

In addition, since the coordinate information on the curvilinear solid can be identified, in the case where the stream dot-pattern formed on a terrestrial globe is read twice for example, a use such that a distance, a difference of population, a difference of an air temperature, or the like between the two points are made to be outputted in a voice or the like will become possible. Besides, since the information is defined based not on existence/not-existence, it will become possible to dissolve a moire which is a streaky periodic pattern, and which is generated by that a part where a dot is formed and a part where a dot is not formed interfere with each other.

A curvilinear solid for information input of the present invention is the curvilinear solid for the information input according to claim 1, wherein said dot-pattern is formed on said curvilinear solid surface in a spiral fashion and/or in a ring shape.

Thereby, if stream dot-patterns are connected and arranged in a spiral fashion without space, coordinate information and/or code information can be read at every position on a curvilinear solid using an optical read means. In addition, by that from the length of the circumference of the curvilinear solid in the case where the dot-pattern is provided on the curvilinear solid in a spiral fashion, a length, a size, an interval, and the number of the definite information aggregation are determined in advance and formed on the curvilinear solid, the size of the dot-pattern on the whole curvilinear solid can be made constant, and it becomes possible to form the dot-pattern without a distortion.

In addition, if stream dot-patterns are arrayed and arranged in a ring shape without space, the coordinate information and/or code information can be read at every position on a curvilinear solid using the optical read means. In addition, by that from the length of the circumference of the curvilinear solid in the case where the dot-pattern is provided on the curvilinear solid in a ring shape, a length, a size, an interval, and the number of the definite information aggregation defined on the dot-pattern are determined in advance and formed on the curvilinear solid, the information aggregation can be made definite in each ring, and it becomes possible to form the dot-pattern without a distortion.

A curvilinear solid for information input of the present invention is the curvilinear solid for information input according to claim 1, wherein said dot-pattern is formed on a belt-like print medium, and the belt-like print medium is pasted on said curvilinear solid surface.

Thereby, even if direct printing on the curvilinear solid is not carried out, it becomes possible that a plurality of stream dot-patterns are connected and formed on the curvilinear solid surface in a belt-like shape. That is, by that a stream dot-pattern is printed on a belt-like medium, and it is pasted on a prescribed position of the curvilinear solid, without carrying out printing directly on the curvilinear solid, the curvilinear solid on which a plurality of stream dot-patterns are connected and formed in a belt-like shape can be created easily. As a matter of course, a plurality of stream dot-patterns are arrayed (for example in parallel) and printed on one sheet of a medium to be cut along at least one or more connected stream dot-patterns, and may be pasted on the curvilinear solid. The print media cut in a belt-like shape may be pasted in conformity to the shape of the curvilinear solid in a spiral fashion, in a ring shape and/or in a straight line shape.

A curvilinear solid for information input of the present invention is the curvilinear solid for the information input according to claim 3, wherein said belt-like print medium is wound and pasted on said curvilinear solid surface in a spiral fashion and/or in a ring shape.

Thereby, even if direct printing on the curvilinear solid is not carried out, it becomes possible that on the surface of the curvilinear solid, a plurality of dot-patterns are connected and formed in a spiral fashion and/or in a ring shape.

That is, by that on one sheet of belt-like medium, a plurality of stream dot-patterns are connected and printed in a belt-like shape to be wound and pasted on the surface of the curvilinear solid in a spiral fashion without space, without carrying out printing directly on the curvilinear solid, the curvilinear solid on which a belt-like dot-pattern is formed in a spiral fashion can be created easily. A belt-like print media at the time of carrying out pasting in a spiral fashion has a shape like a skin which is stripped in a spiral fashion from fruits such as an apple, and a stream dot-pattern is connected and formed in a belt-like shape on one medium which is not separated, and may be formed on the whole surface of the curvilinear solid. As a matter of course, two or more sheets may be printed, and may be connected to be pasted.

In addition, a plurality of stream dot-patterns are connected and printed in a belt-like shape on two or more sheets of belt-like media, respectively, and by winding and pasting them like going around on the surface of the curvilinear solid in a ring shape without space, a curvilinear solid with a belt-like dot-pattern formed in a ring shape can be created easily without carrying out printing directly on the curvilinear solid.

However, a belt-like medium where a length, a size, and an interval of a definite information aggregation defined on a dot-pattern are definite is used to be made to go around, be wound and pasted on the surface of the curvilinear solid, and then, information may be lacking and be unable to be read at a joint. As a matter of course, a stream dot-pattern where a length, a size, an interval, and the number of a definite information aggregation defined on a dot-pattern are determined in advance from the length of the circumference of the curvilinear solid in the case where a dot-pattern is provided in a ring shape on the curvilinear solid may be printed on the belt-like medium. Thereby, in each ring, an information aggregation can be made to be definite, and it becomes possible to form a dot-pattern without distortion.

A curvilinear solid for information input of the present invention is the curvilinear solid for the information input according to claim 1, wherein said first virtual reference line is defined at least on a real line formed visibly on said curvilinear solid surface.

Thereby, it becomes possible to make a real line itself which a user can identify visually have information, and input and output of the information which are rich in convenience become possible.

Here, "at least" means that in a part where a real line is visibly formed on the curvilinear solid, the first virtual reference line may have been defined on the real line, and in a part where the real line is not formed, the first virtual reference line can be defined freely without being limited to this.

A curvilinear solid for information input of the present invention is the curvilinear solid for the information input according to claim 1, wherein said curvilinear solid is a terrestrial globe, a star globe, or a celestial globe, and said dot-pattern defines, in place of said coordinate information, latitude/longitude information on the terrestrial globe, the star globe, or the celestial globe, and/or, regional information on the terrestrial globe, the star globe, or the celestial globe as said code information.

In this manner, by defining latitude/longitude information and/or regional information, from the code information defined on areas such as the printed symbols and place names printed on a terrestrial globe, a star globe and a celestial globe, a descriptive text, an image, a moving image and voice information, or the like of these symbols and place names or the like can be outputted from a display device, a loudspeaker, or the like, and from the latitude/longitude on the terrestrial globe or the star globe and the celestial globe, a temperature and climate, a concentration of $CO_2$ or the like, and various information based on the region, which are corresponding to that, will be possible to be made to be outputted from the display device. Besides, in an area where the area on which the code information is defined and the latitude/longitude to which associated information is allocated overlap, the associated information can be switched and outputted by a prescribed method.

Here, the terrestrial globe or the star globe or the celestial globe in the present invention, may be not only a general one which supports a curvilinear solid at the poles with a support part provided on a pedestal, and rotates the curvilinear solid with the axis connecting the poles as a center, but also may include one which supports and floats/rotates the curvilinear solid with a magnet, and also one with a map printed on a spherical body made of firm paper or plastics, or may be one with a map printed on a spherical body like a balloon. In addition, as a celestial globe, a Mercury globe, a Venus globe, a Moon globe, a Mars globe, a Jupiter globe, or the like are included, for example.

A curvilinear solid for information input of the present invention is the curvilinear solid for the information input according to claim 1, wherein said curvilinear solid is a body of revolution.

Thereby, a coordinate value of a cylindrical coordinate system can be defined accurately, and if a belt-like print medium on which a plurality of stream dot-patterns are connected and printed is arranged without space in a spiral fashion or in a ring shape, the coordinate information and/or the code information can be read even at any arbitrary position using the optical read means.

A curvilinear solid for information input of the present invention is the curvilinear solid for the information input according to claim 1, wherein said curvilinear solid is a spherical body.

Thereby, a coordinate value of a spherical coordinate system can be defined accurately, and if a belt-like print medium where a plurality of stream dot-patterns are connected and printed in a belt-like shape is arranged in a spiral fashion or in a ring shape without space, the coordinate information and/or the code information can be read even at any arbitrary position using the optical read means.

A curvilinear solid for information input of the present invention is the curvilinear solid for the information input according to claim 1, wherein said curvilinear solid is a three-dimensional fabrication object such as a three-dimensional map, a sculpture, a building, and a human body model.

Thereby, in the case of one closed free sculptured surface body, if the belt-like print media where a plurality of stream dot-patterns are connected and formed in a belt-like shape are used properly appropriately and arranged without space for every part thereof in a spiral fashion, in a ring shape, or in a straight line shape, it is possible to read the coordinate information and/or code information even at any arbitrary position using the optical read means.

Here, "Three-dimensional fabrication object" means all the modeling objects such as a three-dimensional map (not only one expressed in three dimensions, such as a mountain and valley, a canyon and building, or the like, but also cases in which the map itself are three-dimensional, are included), a building in a city model, a plastic model, a design model, and a human body model, and the "three dimensions" is what means one of which shape can be identified with a tactile sense, and also lines elevated or depressed slightly for indicating a road or railroad on a map are included in "three dimensions" mentioned here. That is, in the curvilinear solid for information input according to the present invention, not only ones where a whole shape is formed as a curvilinear solid such as a terrestrial globe, but also the cases where each object which is formed therein and which defines the information can be identified as a curvilinear solid although the whole shape is planar are included.

A map for information input of the present invention is the map where a dot-pattern in which dots are arranged based on a prescribed rule is formed on the surface thereof, wherein the dot-pattern is a stream dot-pattern comprising: a plurality of reference dots arranged contiguously in a line form; a first virtual reference line which connects the plurality of reference dots, and which is comprised of a straight line, a polygonal line and/or a curved line; a second virtual reference line which are defined on a prescribed position from the reference dot and/or the first virtual reference line, and is comprised of a straight line and/or a curved line; a plurality of virtual reference points provided on a prescribed position on the second virtual reference line; and an information dot where information is defined based on a distance and a direction from the virtual reference point, wherein the plurality of stream dot-patterns are connected and formed in a belt-like shape on a surface of the map, and the first virtual reference line is provided on an isopleth line which is formed on the map surface visibly, and which connects points where a value of a prescribed parameter is equal (a contour line, a constant-pressure line, an isotach, and a constant-temperature line), and coordinate information and/or code information indicating a position on a map are defined based on a prescribed rule of the dot, and when an arbitrary position on the map is imaged by an optical read means, the coordinate information and/or code information of the imaging center are read.

Thereby, if the stream dot-pattern is arranged along the isopleth lines expressed visibly in order to indicate various information including a contour line, a constant-pressure line, an isotach, and a constant-temperature line or the like, and the coordinate information and/or the code information can be read even at any arbitrary position using the optical read means.

Here, by that the value of the isopleth line is defined on the code information, or associated information is made to be linked with the code information, a grid map (a tentative name of the map using a dot-pattern) which is excellent in convenience can be provided.

In addition, a map for information input of the present invention is the map for the information input according to claim 10, wherein said first virtual reference line, in place of an isopleth line which is formed on the map surface visibly, and which connects points where a value of a prescribed parameter is equal (a contour line, a constant-pressure line, an isotach, and a constant-temperature line), is provided on an outline indicating a width of a road, or a center line indicating a road, or a character and character string, which are formed visibly on said map surface, or on a virtual center line indicating a center of a road. Thereby, if the first virtual reference line, i.e., the stream dot-pattern, is formed along a straight line, a polygonal line, a curved line, a solid line, various dotted lines, a thick line, a double line or the like, the coordinate information and/or the code information can be read even at any arbitrary position using the optical read means.

Here, by that the road name is defined, and the associated information is made to be linked therewith, the grid map (a tentative name of the map using a dot-pattern) which is excellent in convenience can be provided. In addition, the stream dot-patterns are formed on prescribed positions along characters and character strings which indicate various map information such as a place name and an institution, a crossing, and the associated information is made to be linked therewith, and thereby, the detailed information on the map can be acquired easily. Furthermore, since the detailed information can be acquired, an easy-to-see map can be provided by expressing the characters and character strings which indicate the map information as briefly as possible or by deleting them.

A drawing for information input of the present invention is the drawing where a dot-pattern in which dots are arranged based on a prescribed rule is formed on the surface thereof, wherein the dot-pattern is a stream dot-pattern comprising: a plurality of reference dots arranged contiguously in a line form; a first virtual reference line which connects the plurality of reference dots, and which is comprised of a straight line, a polygonal line and/or a curved line; a second virtual reference line which are defined on a prescribed position from the reference dot and/or the first virtual reference line, and is comprised of a straight line and/or a curved line; a plurality of virtual reference points provided on a prescribed position on the second virtual reference line; and an information dot where information is defined based on a distance and a direction from the virtual reference point, wherein the plurality of stream dot-patterns are connected and formed in a belt-like shape on a surface of the drawing, and the first virtual reference line, is provided on a real line formed visibly on the drawing surface, and coordinate information and/or code information indicating a position on a drawing are defined based on a prescribed rule of the dot, and when an arbitrary position on the drawing is imaged by an optical read means, the coordinate information and/or code information of the imaging center are read.

Thereby, if the stream dot-patterns are arranged along real lines indicated by a straight line, a polygonal line, a curved line, a solid line, various dotted lines, a thick line, the double line, or the like, the coordinate information and/or the code information can be read even at any arbitrary position using the optical read means. Furthermore, if the information (vector information) for drawing real lines is defined on the stream dot-pattern along the real lines, drawing and displaying and editing are carried out by CAD on the basis of the read coordinate information and/or code information, and the drawings can be outputted repeatedly.

A drawing for information input of the present invention is the drawing for the information input according to claim 12, wherein said first virtual reference line, in place of a real line formed visibly on the drawing surface, is provided on an outline of an object which is formed visibly on said drawing surface, or an indicating line which indicates an object, or a leading line for indicating a description of an object, or a dimension line indicating a size of an object, or a character and character string, or a virtual center line indicating a center of an object.

Thereby, if stream dot-patterns are formed along real lines which indicate an object which will be a design object, and/or characters and character strings indicated on the drawings, and various associated information such as a type, product number, specification, a color, a pattern, a quality of material, material, fittings, a fabrication method, a constructing method, a working schedule, or the like of the object are made to be associated therewith, various information are acquired by one drawing, and a grid drawing (tentative name of a drawing using a dot-pattern) excellent in convenience can be provided.

Effect of the Invention

As for the present invention, on an information inputting media such as a curvilinear solid, a map, and a drawing, stream dot-patterns capable of defining coordinate information and code information which indicate a prescribed position and drawn line segment on these media are connected and formed in a belt-like shape, and thereby, the coordinate information and code information can be defined accurately on the line segment drawn on the curvilinear solid and a medium surface of all the shape, and furthermore, an effect that a moire which is a streaky periodic pattern is lessened is brought out.

BEST MODES FOR CARRYING OUT THE INVENTION

First, a dot-pattern used for a curvilinear solid for information input of the present invention will be described.

Figure 1:
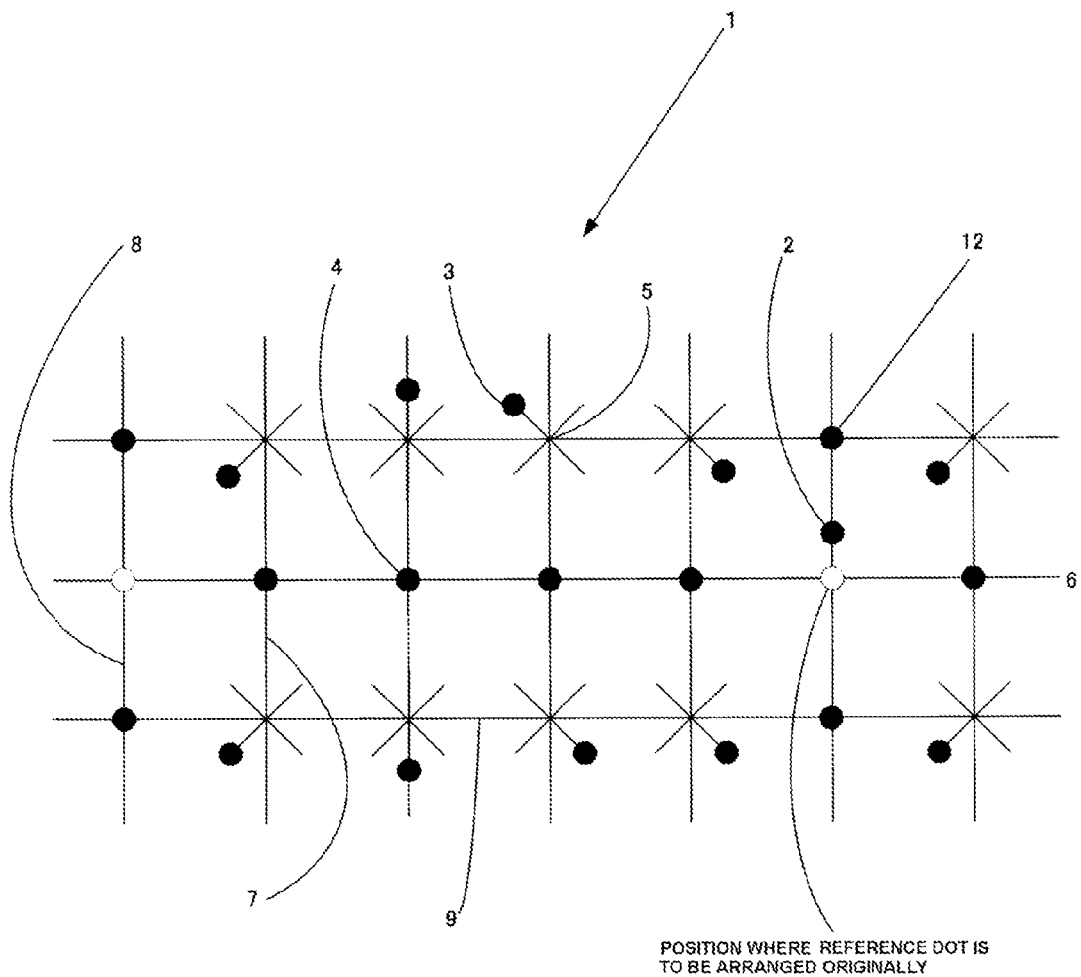
FIG. 1 is a figure showing a skeleton of a stream dot-pattern.
Figure 2:
FIG. 2 is a figure showing an example of an information dot of the dot-pattern, and a bit-expression of data defined thereon.

FIG. 1 is an explanatory view showing a dot-pattern of the present invention, and FIG. 2 is an enlarged view showing an example of an information dot of the dot-pattern and a bit-expression of data defined thereon.

An information input/output method using the dot-pattern of the present invention is comprised of identification of a dot-pattern 1, and means for outputting information from the dot-pattern 1 and executing a program.

That is, the dot-pattern 1 formed on an area to which information is wanted to be given (for example, a real line formed on a medium) is taken in by an optical read means as image data, and reference dots 4 are extracted first, and a line connecting these reference dots 4 is defined as a first virtual reference line 6. Then, on this first virtual reference line 6, in the case where a dot is not arranged in a position where the reference dot 4 is to exist originally, a dot in the area surrounding the position where this reference dot 4 is to be arranged is extracted and is defined as a key dot 2 (both end parts of a definite information aggregation, stream dots). Then, next, a side dot 12 arranged on a extension line in a positive/negative direction of a displacement of the key dot 2 is extracted, and a straight line which passes through the side dot 12 and the key dot 2 and is perpendicular to the first virtual reference line 6 is defined as a third virtual reference line 8.

Then, a second virtual reference line 7 which passes through a reference dot 4 and is perpendicular to the first virtual reference line 6 and a fourth virtual reference line 9 which passes through the side dot 12 and is parallel to the first virtual reference line 6 are configured, and a point of intersection of both of the virtual reference lines is defined as a virtual reference point 5. Then, a dot in the area surrounding this virtual reference point 5 is searched for, and an information dot 3 on which information is defined based on a distance and direction from the virtual reference point 5 is extracted.

In this case, from that a ratio of an arrangement interval of the reference dots 4 to a distance from the first virtual reference line 6 to the side dot 12 is one-to-one, a square which has a reference dot 4 as a vertex and where a ratio of a vertical/horizontal length is one-to-one is configured on the first virtual reference point 6, and a position of the virtual reference point 5 can be complemented and derived. The ratio of the vertical/horizontal length can be determined arbitrarily.

Then, based on a direction of a displacement of the key dot 2 from the first virtual reference line 6, a direction of the definite information aggregation, that is, a direction of the dot-pattern 1 is determined. For example, in the case where the key dot 2 is displaced in a direction of +Y from the first virtual reference line 6, the direction is defined as a normal position, and the information dot 3 within the definite information aggregation may be identified.

In addition, in the case where the key dot 2 is displaced in a direction of −Y from the first virtual reference line 6, a direction where the definite information aggregation is rotated by 180 degrees around the center thereof is defined as a normal position, and the information dot 3 within the definite information aggregation may be identified.

In this case, also based on a distance between the side dot 12 and the key dot 2, the direction of the dot-pattern 1 can be defined. For example, in the case where a distance between the key dot 2 and the side dot 12 arranged in the direction of +Y, is shorter than a distance between the key dot 2 and the side dot 12 arranged in the direction of −Y, the information dot 3 within the definite information aggregation may be identified with this direction as a normal position.

In the case where a distance between the key dot 2 and the side dot 12 arranged in the direction of −Y is shorter than a distance between the key dot 2 and the side dot 12 arranged in the direction of +Y, a direction where the definite information aggregation is rotated by 180 degrees around the center thereof is defined as a normal position, and the information dot 3 within the definite information aggregation may be identified.

When an image of the dot-pattern 1 read by an optical read means is accumulated in a frame buffer, a central processing unit (CPU) of the optical read means analyzes dots in the frame buffer, and based on a distance and direction between each information dot 3 and a virtual reference point 5, decodes a numerical value (refer to FIG. 2, FIG. 3 and FIG. 4) defined for every information dot 3. Then, these numerical values are collated with information stored in a memory of an optical read means or a personal computer as a XYZ coordinate or a code value, and a voice, an image, a moving image, a character, a program, or the like corresponding to the XYZ coordinate or the code value are read to be outputted from a display unit, and a voice/picture output means.

Generation of the dot-pattern 1 of the present invention, for making information such as a voice or the like identified by a dot code generation algorithm, minute dots, that are, a key dot 2, an information dot 3, a reference dot 4, and a side dot 12 are arranged in accordance with a prescribed rule (for example, it is included that dots which will become a reference are arranged in a line form continuously, and from the plurality of arranged reference dots, a virtual reference line constituting a polygon is formed, and a virtual reference point is formed in a vertex of the polygon, and at a terminal point of a vector having the virtual reference point as a starting point, dots in which information is defined are provided, or the like. Besides, it is possible to define the direction of the dot-pattern based on a shape of this polygon).

As shown in FIG. 1, a straight line in a transverse direction constituting a definite information aggregation of the dot-pattern 1 formed along with the reference dots 4 (a straight line shape in the present illustration) arranged in a line form is formed on a medium as a first virtual reference line 6.

Next, the side dot 12 is provided on a third virtual reference line 8 which is perpendicular to the first virtual reference line 6 and passes through the reference dot 4 (in the present illustration, a reference dot arranged as the key dot 2). Then, a straight line which passes through the reference dot 4 and is parallel to the third virtual reference line 8 is defined as a second virtual reference line 7, and a straight line which passes through the side dot 12 and is parallel to the first virtual reference line 6 is defined as a fourth virtual reference line 9. In addition, with respect to the Key dot 2 arranged in a prescribed position (in the present illustration, on the third virtual reference line 8) on a medium, based on the direction of a displacement from the first virtual reference line 6 and the distance from the side dot 12, the direction of the dot-pattern is made to be defined, and from an arrangement interval between said side dot 12 and/or key dot 2, a definite information aggregation of the dot-pattern 1 is made to be defined.

Besides, the present dot-pattern 1 can be formed along a real line formed visibly on a medium surface, and the real line mentioned here is a concept against a virtual line, and is one which includes all the lines which actually exist on a medium on which information is defined by a dot-pattern.

For example, a solid line, a dashed line, a dotted line, a straight line and a curved line, or the like are included, regardless of a medium with lines formed thereon (for example, a display of an image display device) and a substance constituting lines (for example, ink), in the present invention. Besides, a dot-pattern may be a printing and a screen display, and in addition, a convex and concave such as a hole and a groove on metal or plastics.

Then, a point of intersection between the second virtual reference line 7 and the fourth virtual reference line 9 is defined as a virtual reference point 5.

One or more information dots 3 having the distance and direction on the basis of the virtual reference point 5 configured in this manner are each arranged, and the dot-pattern 1 is generated.

In the case where this dot-pattern 1 is taken in as image data by an optical read means, it is possible to correct, by said reference dot 4, a distortion of a lens or the like or imaging sideways of the optical read means, expansion and contraction of a paper surface, a curvature of a medium surface and a distortion at the time of printing. Specifically, calculated is a function (Xn, Yn)=f(Xn', Yn') for correction which converts one or more distorted virtual reference points 5 into the original polygon (in the present illustration, a square), and the information dot 3 is corrected by the same function, and a vector of the correct information dot 3 is calculated.

If the reference dots 4 are arranged in the dot-pattern 1, image data with this dot-pattern 1 taken in by an optical read means corrects a distortion resulting from the optical read means and/or a distortion due to imaging sideways, and therefore, even in the case of imaging sideways using a prevalent camera with a lens of a high distortion factor attached on, the accurate identification can be carried out also in the case of taking in image data of the dot-pattern 1. In addition, even in the case where reading is carried out with the optical read means inclined to a surface of the dot-pattern 1, the dot-pattern 1 can be identified accurately by the prescribed algorithm.

The key dot 2 is a dot arranged at both ends of a definite information aggregation, as shown in FIG. 1. This key dot 2 is a representative point of the dot-pattern 1 for one area indicating an aggregation information dots group. The representative point may be arranged anywhere in the aggregation information dots group. For example, if an adjacent reference dot interval is 0.5 mm, the reference dot 4 at an edge part of the area of the dot-pattern 1 is configured to be arranged in the position displaced upwards by 0.1 mm from the position where it is to be arranged originally. Therefore, in the case where the information dot 3 is defined by an X, Y coordinate value from the reference dot 4, the position having the distance downward by 0.1 mm from the key dot 2 will become the coordinate point. However, this numerical value (0.1 mm) is not limited to this, and is preferable to be a displacement around 20 to 25% of the reference dot interval, and is one which can be variable depending on a size of the area of the dot-pattern 1.

An information dot 3 is a dot which makes various information identified. This information dot 3 is one which is arranged at a terminal point expressed with a vector with a virtual reference point 5 as a starting point. For example, this information dot 3, as shown in FIG. 2, since the dot apart from the virtual reference point 5 by 0.1 mm has a direction and length which are expressed by a vector, is rotated clockwise by a unit of 45 degrees, and is arranged in 8 directions, and is expressed by 3 bits.

According to this figure, 3 bits×8=24 bits can be expressed by one definite information aggregation (stream dots).

Besides, in an example of illustration, 3 bits are expressed by carrying out arrangement in the 8 directions, and however, without being limited to this, it is also possible to express 4 bits by carrying out arrangement in the 16 directions, and a displacement around 15 to 30% of the interval of the reference dots 4 is preferable. As a matter of course, it is needless to say that the arrangement can be carried out by any length in any directions.

In addition, in FIG. 1, at all the virtual reference points 5, an information dot 3 has been arranged at the terminal point position with this virtual reference point 5 as a starting point, and however, without being limited to this, information may be made to be defined depending on whether a dot is arranged or not on a virtual reference point. For example, the information can be defined in such a way as it is "1" if a dot is arranged on a virtual reference point, and it is "0" if it is not arranged.

A dot diameter of a key dot 2, an information dot 3, a reference dot 4, and a side dot 12, in consideration of an appearance and a printing accuracy for a paper quality, a resolution of an optical read means and optimal calculation speed or the like, are preferable to be about 0.03 to 0.08 mm around 6 to 16% of the interval of reference dots 4. However, if a technology advances and printing accuracy, a resolution of an optical read means, and an optimal calculation speed are enhanced, it is needless to say that the diameter of the dot becomes close to 0 without limit.

As the result, not only any position on a medium surface is photographed, but also an image of the whole medium surface will be photographed and all the information will become able to be identified at one time. If a high precision scanner is used even in the actual condition, it is needless to say that the information defined on the whole medium surface can be identified at one time. On the other hand, in the case where printing is carried out on a huge medium surface, and photographing is carried out from a distant place, based on a resolution and optimal calculation speed of an optical read means, the diameter and arrangement interval of the dot may be determined appropriately.

In addition, in the case where a photographing bore diameter of the optical read means is around 4 mm in diameter, in consideration of a required amount of information for the imaging area and misidentification of various dots 2, 3, 4, and 12, the interval of reference point dots 4 is preferable to be around 0.3 to 0.5 mm. It is needless to say that this interval also becomes close to 0 without limit, if a technology advances and printing accuracy, a resolution of an optical read means, and an optimal calculation speed are enhanced. In consideration of misidentification between the reference dot 4 and the information dot 3, a displacement of the key dot 2 is preferable to be around 20 to 25% of the interval of reference dots 4.

The interval between this information dot 3 and the virtual reference point 5 is preferable to be about 15 to 30% of a distance between adjacent virtual reference points 5. It is because the dots are apt to be visually identified as a large lump and become visually undesirable as a dot-pattern 1, if a distance between the information dot 3 and the virtual reference point 5 is nearer than this interval. It is because the identification whether it is the information dot 3 to which a vector-direction is given with any of adjacent virtual reference points 5 as a center becomes difficult, on the contrary if the distance between the information dot 3 and the virtual reference point 5 is further than this interval.

In addition, a size of the dot-pattern 1 comprised of these various dots is preferable to be 2 mm or less in the case where the photographing bore diameter is 4 mm in diameter. That is, it is preferable to be a value not more than a square of ½ of the diameter of the imaging bore diameter (a value to the extent where a stream dot-pattern comes within a area of K/2×K/2, when a diameter of a imaging bore diameter is defined as K).

Reading of a dot-pattern according to the present invention is performed by optical read means (for example, a camera and a scanner), and is performed by that a dot-pattern of a prescribed position, a prescribed area or all the areas is read with the optical read means contacted on or spaced from the medium surface, or that a dot-pattern formed in a line form is traced and read.

That is, reading of the dot-pattern is performed by that a prescribed position or a prescribed area of the medium surface is photographed from over the medium surface with the optical read means and the information defined thereon is read, or by that the whole medium surface is photographed at a prescribed distance from the medium surface with a high resolution camera, or by that the information defined on a whole medium surface is read with a high resolution scanner.

In addition, it will be possible to define huge information in the case where the information is defined on a dot-pattern having a sufficient length, and in this case, by tracing an area where the dot-pattern on the medium surface is formed, reading of the information is performed.

That is, the optical read means traces along lines which draw a drawing or a figure formed visibly on the medium surface, and reads the information, and traces along a frame of a photograph and an image or a contour of an object in a photograph or an image, and reads the information. In addition, it is also possible to trace along a character string on the medium surface, and read the information.

Figure 3:
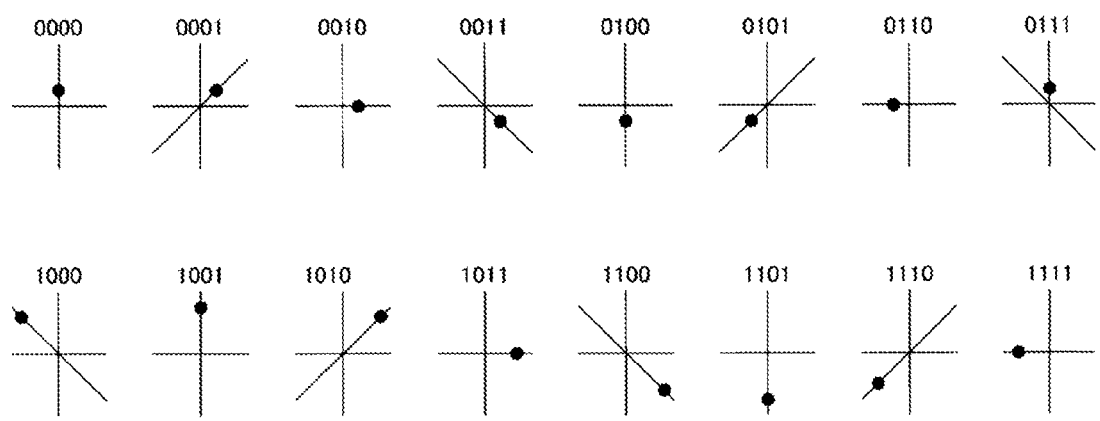
FIG. 3 is a figure showing an example of the information dot of the dot-pattern, and the bit-expression of data defined thereon.

FIG. 3 shows examples of an information dot and a bit-expression of data defined thereon, and shows other modes.

In addition, as for the information dot 3, when used are two types of a short type (upper stage of FIG. 3) and a long type (lower stage of FIG. 3) from the virtual reference point 5 derived from the reference dot 4, and when the vector directions are defined as 8 directions, 4 bits can be expressed. At this time, it preferable that the long one is about 25 to 30% of a distance between adjacent virtual reference points 5, and the short one is about 15 to 20%. However, a center interval between the short type and long type of the information dot 3 is preferable to become longer than a diameter of these dots.

The information dot 3 is preferable to be one dot in consideration of the appearance. However, in the case of disregarding the appearance and expecting to increase an amount of information, by allocating one bit for every vector and expressing the information dot 3 by a plurality of dots, a large amount of information can be included. For example, with vectors of 8 directions on a concentric circle, information of the 8th power of 2 can be expressed by the information dot 3 defined from the reference dot 4, and it becomes the 64th power of 2 with eight information dots of one definite information aggregation.

Figure 4:
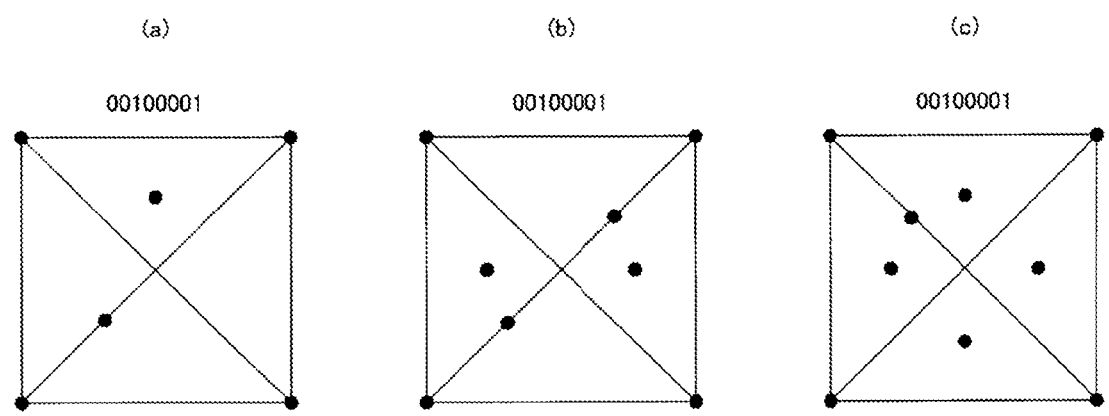
FIG. 4 is a figure showing an example of the information dot of the dot-pattern, and the bit-expression of data defined thereon.

FIG. 4 shows examples of information dots 3 and bit-expressions of data defined thereon. In the present illustration, virtual reference points and information dots are arranged between reference dots arranged in parallel and the first virtual reference line, and (a) shows an example where 2 dots are arranged, (b) shows an example where 4 dots are arranged, and (c) shows an example where 5 dots are arranged.

Figure 5:
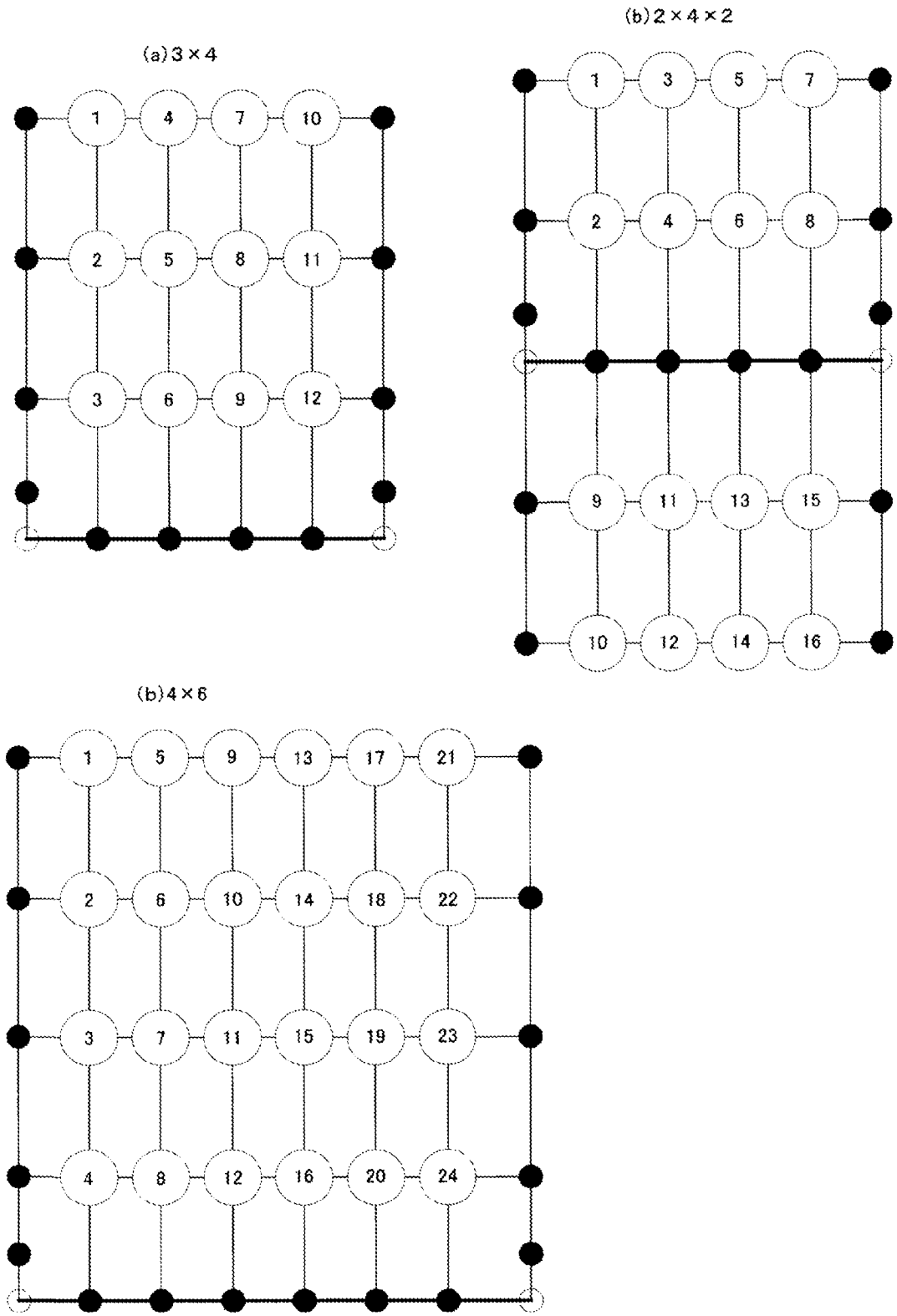
FIG. 5 is a figure showing a modification example of the dot-pattern.

FIG. 5 shows a modification example of a dot-pattern, (a) shows one in which 12 information dots 3 are arranged in the area, (b) shows one in which 16 information dots 3 are arranged in the area, and (c) shows one in which 24 information dots 3 are arranged in the area.

The dot-pattern 1 shown in above-mentioned FIG. 1 shows an example in which 8 information dots 3 is arranged in a definite information aggregation. However, as for this information dot 3, without being limited to arranging 8 dots in the definite information aggregation, various modifications are possible. For example, in accordance with a size of an amount of information to be needed or a resolution of an optical read means, there are: one in which 12 information dots 3 are arranged in the definite information aggregation (FIG. 5 (a)); one in which 16 information dots 3 are arranged in the definite information aggregation (FIG. 5 (b)); and one in which 24 information dots 3 are arranged in the definite information aggregation (FIG. 5 (c)).

Then, with reference to FIG. 6 to FIG. 7, a method of forming a dot-pattern will be described.

Figure 6:
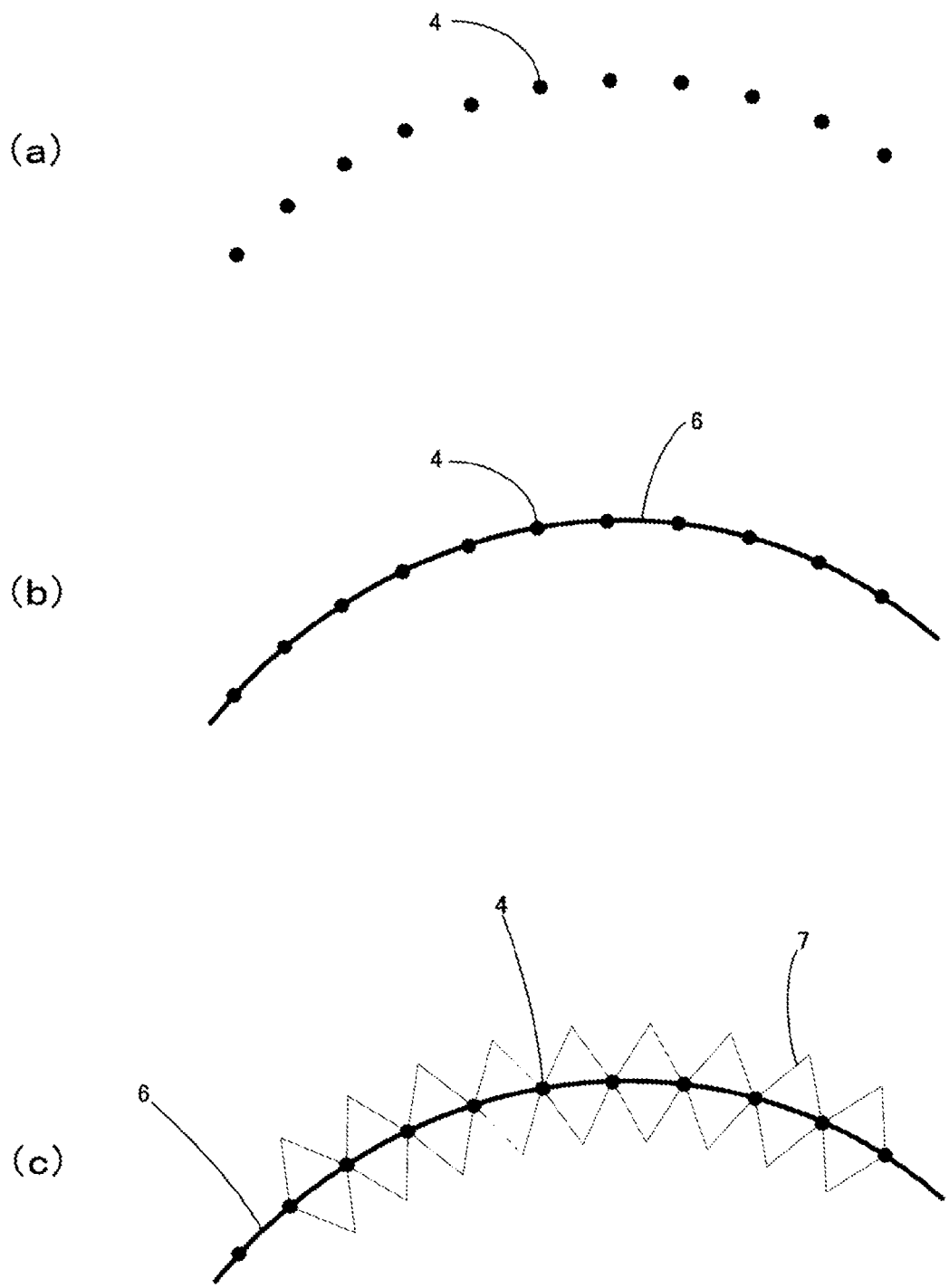
FIG. 6 is a figure describing a method for forming of the stream dot-pattern.
Figure 7:
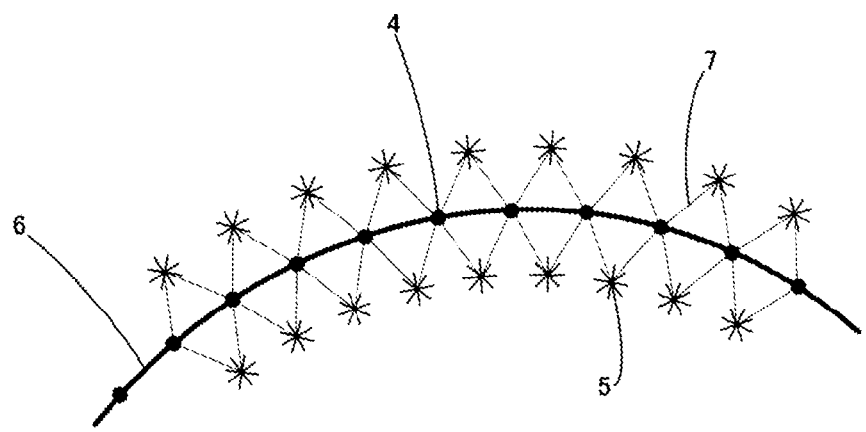
FIG. 7 is a figure describing a method for forming of the stream dot-pattern.
Figure 7:
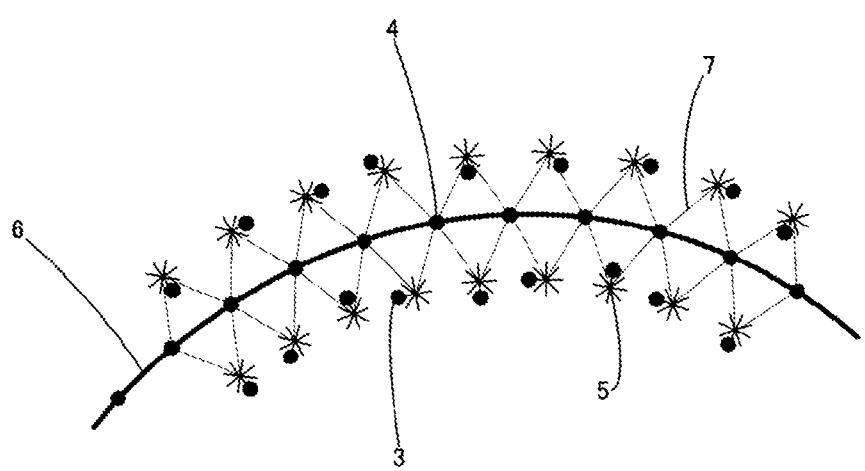

FIG. 6 and FIG. 7 show in order an example of a process of forming a stream dot-pattern.

A dot-pattern according to the present invention, unlike a conventional dot-pattern, as a process 1, first, a plurality of reference dots 4 are arranged in a line form continuously at a part where information is wanted to be inputted and outputted corresponding to visible information on a medium surface.

Although in FIG. 6 (a), reference dots 4 are arranged in a curved line form, an arrangement of the reference dots 4 is not limited to this, and a straight line and a curved line are mixed, and a polygonal line shape constituted by a plurality of line segments is used, and so on, possible are various modifications for forming the dot-pattern in a shape matched to an area where information is made to be inputted and outputted.

In addition, reference dots 4 may be arranged on a real line formed visibly on the medium surface, and reference dots 4 may be arranged along a real line based on a prescribed rule.

Besides, although the reference dots are preferable to be arranged at equal intervals from a viewpoint of reading accuracy improvement, it is not limited to this, and it is possible to define the definite information aggregation of the dot-pattern by intermingling a plurality of intervals, and to define both the definite information aggregation of the dot-pattern and the direction of the dot-pattern based on arrangement intervals among three different reference dots in the definite information aggregation.

Then, as a process 2, provided is the first virtual reference line 6 which connects reference dots 4 arranged in a line form. Although in FIG. 6 (b), the first virtual reference line 6 is provided based on a curved line form, the first virtual reference line 6 is not limited to this, and the first virtual reference line 6 of a straight line may be provided for reference dots 4 arranged in a curved line, and the first virtual reference line 6 of a curved line may be provided for reference dots 4 arranged in a straight line shape. That is, depending on at which position the second virtual reference line 7, the virtual reference point 5, and the information dot 3 in a process 3 to a process 5 mentioned later are arranged, it is possible to define freely the first virtual reference line 6 which connects reference dots, and which is comprised of a straight line, a polygonal line and/or a curved line.

Figure 8:
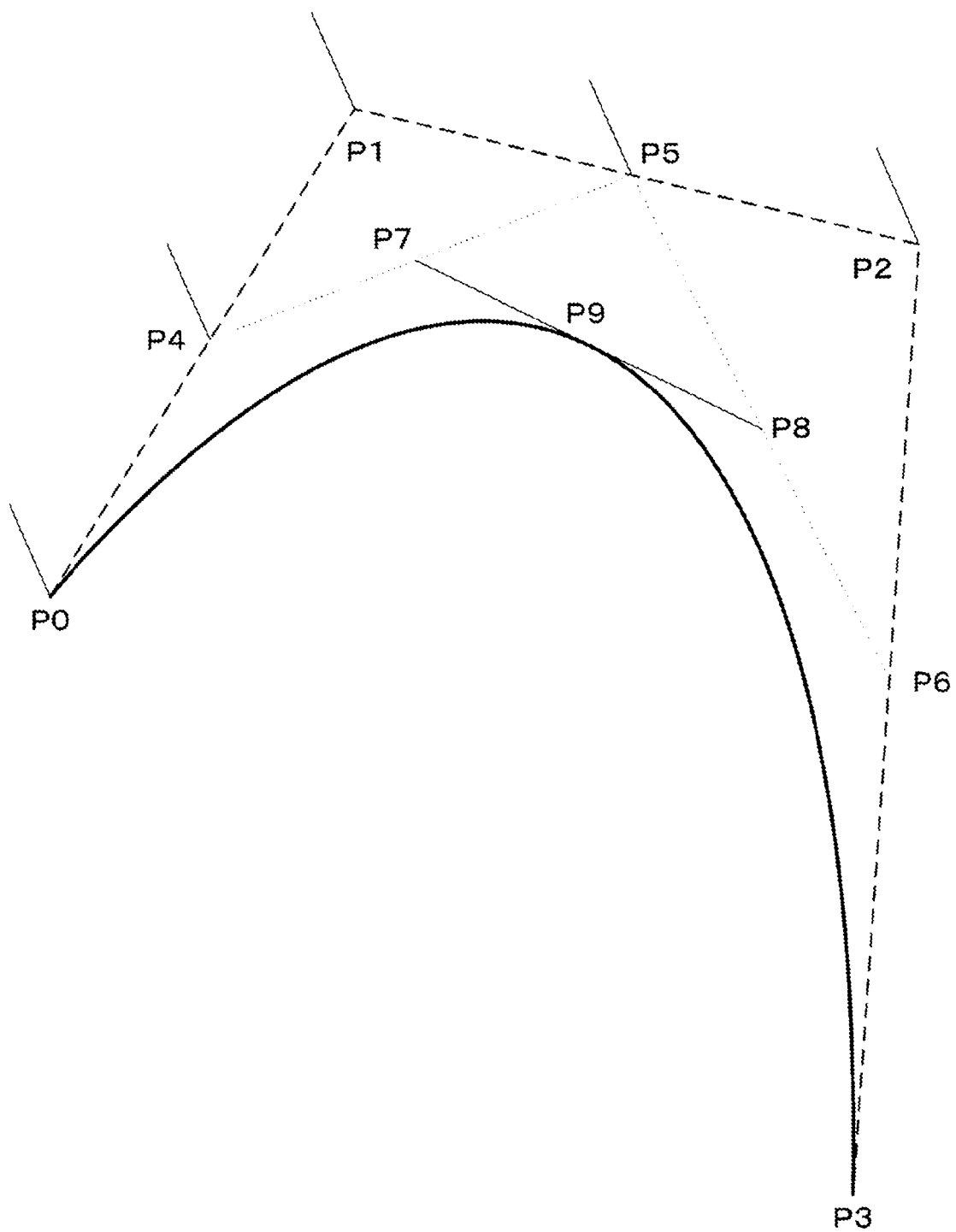
FIG. 8 is figure showing an example where a first virtual reference line is provided by a Bezier curve.

Besides, as an example is shown in FIG. 8, the first virtual reference line 6 in the case of being a curved line is preferable to be based on a Bezier curve.

That is, first, reference dots which exist on the first virtual reference line are defined as P0 and P3, and P1 and P2 are defined as given control points. Then, calculated are points P4, P5 and P6 at which three line segments acquired by connecting in order the control points: P0-P1, P1-P2, P2-P3, are each divided by a one-to-one ratio. Then, calculated are points P7 and P8 at which two line segments acquired by connecting in order these points: P4-P5 and P5-P6, are each divided by a one-to-one ratio.

At the last, calculated is a point P9 at which a line segment (P7-P8) connecting these two points is further divided by a one-to-one ratio, and this point will be a point on the Bezier curve.

The Bezier curve with P0, P1, P2, and P3 as a control point is acquired by performing this procedure repeatedly.

Besides, not only a Bezier curve, but using various algorithms such as a spline curve calculated using a spline function, the nth polynomial equation and an elliptic arc, the first virtual reference line 6 may be provided.

In addition, also in the second virtual reference line and fourth virtual reference line which constitute a stream dot-pattern, it is possible to define by using this method a curved line in the same way as the first virtual reference line.

Then, as a process 3, provided are the reference dots 4 arranged in a line form and/or the second virtual reference line 7 defined at a prescribed position from the first virtual reference line 6. In FIG. 6 (c), the second virtual reference line 7 is provided with an arbitrary angle from the adjacent reference dots 4, toward a prescribed position on a vertical line against a tangent line at a midpoint between adjacent reference dots 4 of the first virtual reference line 6. However, the second virtual reference line 7 is not limited to this, and as shown later, in order to provide the virtual reference point in accordance with an area where information is wanted to be inputted and outputted based on a dot-pattern, it is possible for the second virtual reference line 7 to be defined by various methods.

In addition, by that the second virtual reference line 7 is provided only at one side against the first virtual reference line 6, the direction of the dot-pattern may be defined, and in order to increase an amount of information, the second virtual reference line 7 may be provided each at both sides.

Then, as a process 4, a plurality of virtual reference points 5 are provided at prescribed positions on the second virtual reference line 7. In FIG. 7 (a), the virtual reference point 5 is provided at a point of intersection of the second virtual reference lines 7, that is, at a vertex of an isosceles triangle where a straight line connecting adjacent reference dots 4 is a base, and the second virtual reference lines 7 are the opposite sides. However, the position of the virtual reference point 5 is not limited to this, and possible are various modifications such that the virtual reference point 5 is provided in the middle point of the second virtual reference line 7, and is provided on the reference dot 4 in place of on the second virtual reference line 7.

Then, as a process 5, the information dot 3 is arranged at a terminal point expressed by a vector with the virtual reference point 5 as the starting point. In FIG. 7 (b), the information dot 3 is arranged by one for one virtual reference point 5 so that a vector direction from the virtual reference point 5 may be 8 directions, and a distance from the virtual reference point 5 may be a equal distance. However, an arrangement of the information dot 3 is not limited to this, and it is possible that the information dot 3 is arranged on the virtual reference point 5, and the information dot 3 is arranged with the vector direction as 16 directions, and two information dots 3 are arranged for one virtual reference point 5, or the like, and a plurality of information dots 3 are arranged in a arbitrary length in an arbitrary direction.

In this manner, the stream dot-pattern according to the present invention is formed based on the reference dot arranged continuously in a line form including a curved line, unlike the reference dot which is formed two-dimensionally in a lattice-shaped form in a conventional dot-pattern, which the inventor of the present invention suggests.

Thereby, without the dot-pattern being restrained by a shape of a rectangular area formed as a two dimensional code, it becomes possible to form a dot-pattern based on a free-shaped definite information aggregation in accordance with an information area visibly formed on a medium surface.

Besides, the virtual reference line and the virtual reference point according to the present invention are not necessarily printed and formed actually on a medium surface, and are ones which are configured virtually persistently on an image memory of a computer in the case of arranging a dot-pattern or in the case of reading the dot-pattern.

Then, with reference to FIGS. 9 to 12, a method of forming a dot-pattern on a curvilinear solid will be described.

Figure 9:
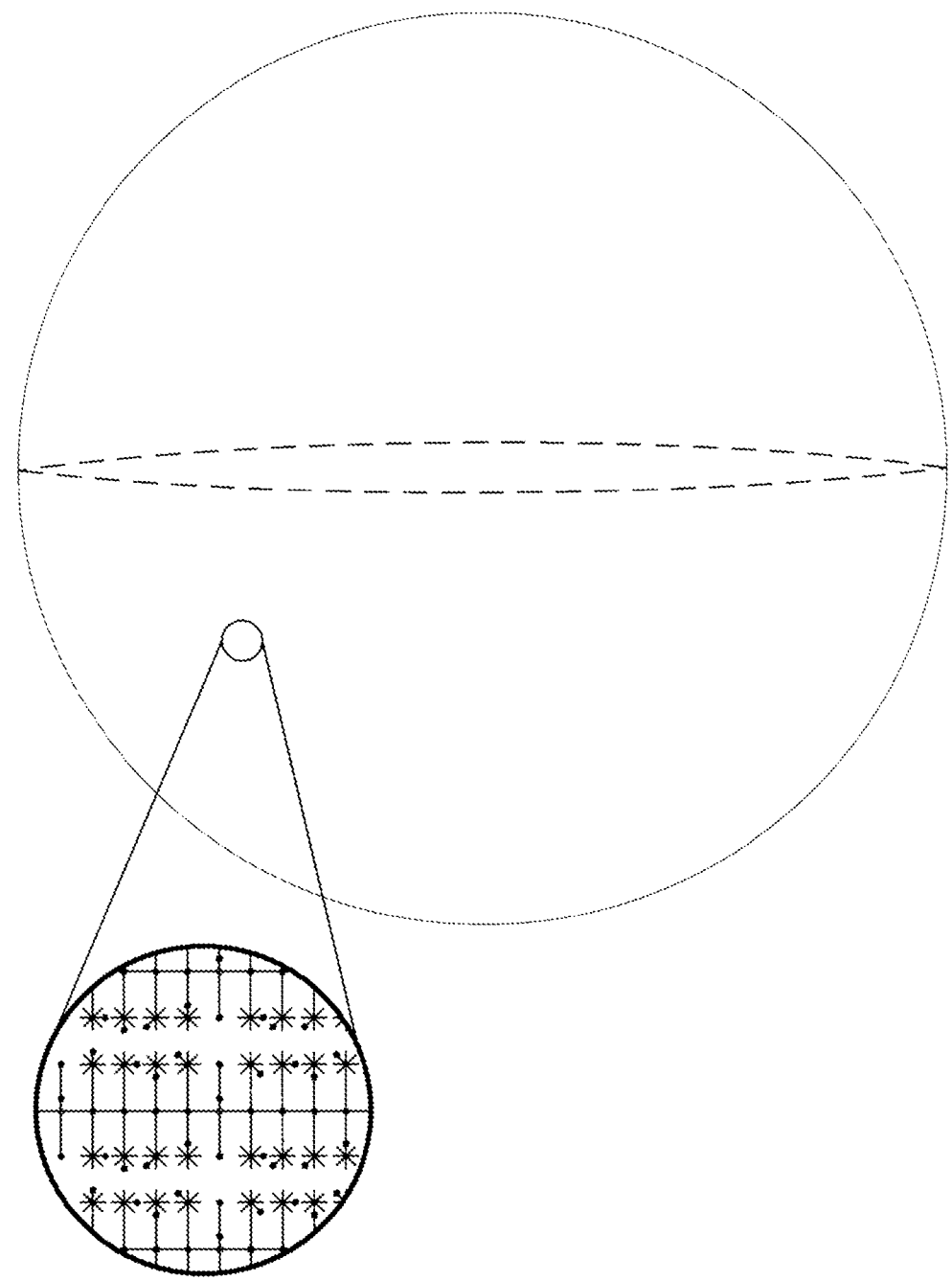
FIG. 9 is a figure showing an example of a curvilinear solid where the stream dot-pattern is formed.

FIG. 9 is a figure showing an example where a stream dot-pattern is formed directly on the surface of the curvilinear solid.

As for the method of formation, there are a case of forming a stream dot-pattern in a spiral fashion, and a case of forming in a ring shape, and if stream dot-patterns are connected in a belt-like shape and arranged in a spiral fashion without space, coordinate information and/or code information at every position on a curvilinear solid can be read using an optical read means.

In the same way, if stream dot-patterns are connected in a belt-like shape and arranged in a ring shape without space, the coordinate information and/or code information at every position on a curvilinear solid can be read using the optical read means.

In addition, by that a length, a size, an interval and the number of a definite information aggregation are determined in advance from the length of the circumference of the curvilinear solid and formed on a curvilinear solid, the size of the dot-pattern on the whole curvilinear solid can be made constant, and it becomes possible to form the dot-pattern without a distortion.

In addition, by that a length, a size, an interval and the number of a definite information aggregation defined on the dot-pattern are determined in advance from the length of the circumference of the curvilinear solid in the case where a dot-pattern is provided in a ring shape on the curvilinear solid and formed on the curvilinear solid, an information aggregation can be made definite in each ring, and it becomes possible to form the dot-pattern without a distortion.

In addition, it is also possible to form the dot-pattern after determining a length, a size, an interval and the number of the definite information aggregation in advance for every ring in accordance with a height of a curvature (curving degree) of the curvilinear solid.

Besides, the virtual reference line and the virtual reference point according to the present invention are not necessarily printed and formed actually on a medium surface, and are ones which are configured virtually persistently on an image memory of a computer in the case of arranging a dot-pattern or in the case of reading the dot-pattern.

Figure 10:
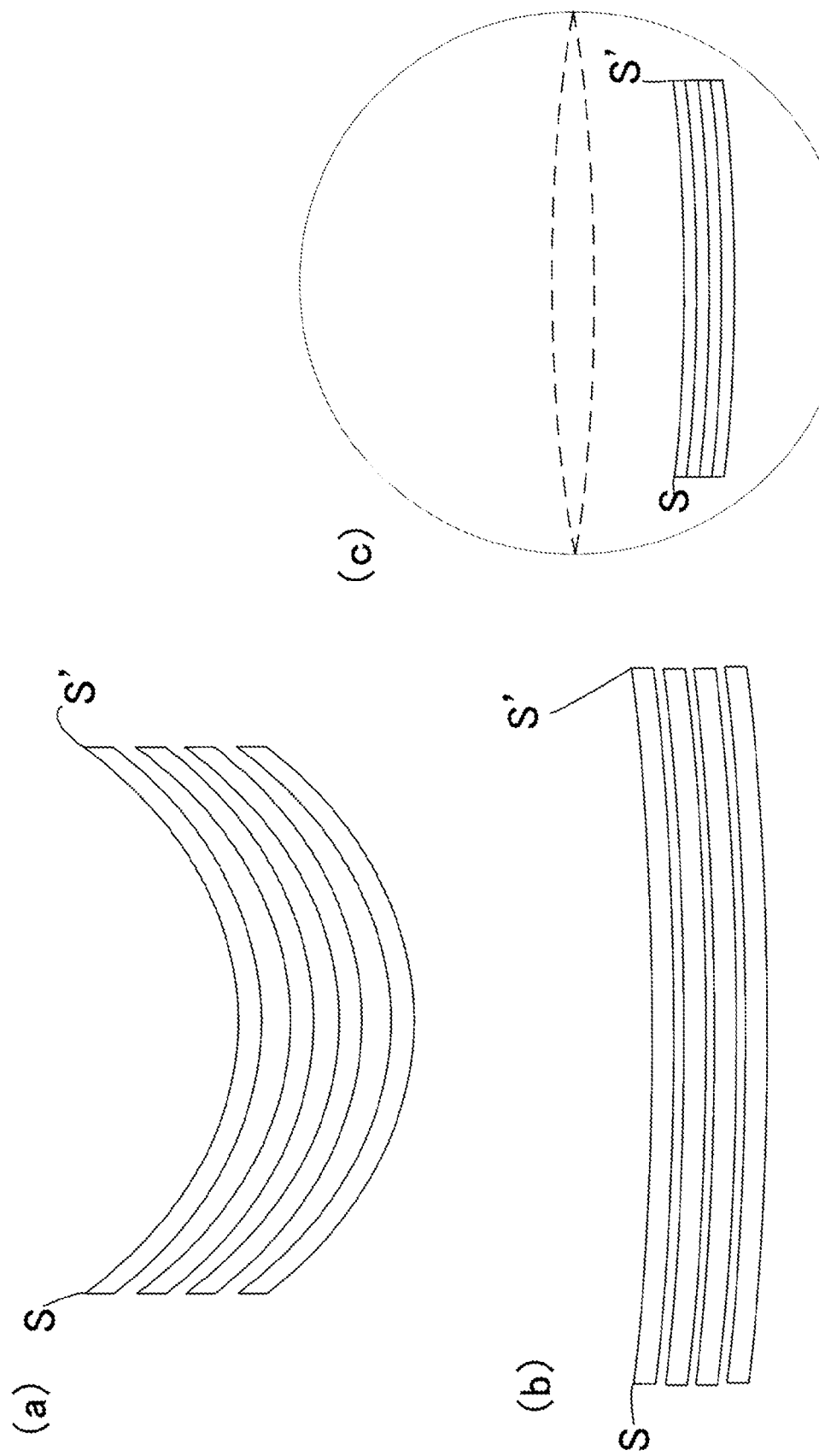
FIG. 10 is a figure describing a method for forming of the stream dot-pattern on the curvilinear solid.
Figure 11:
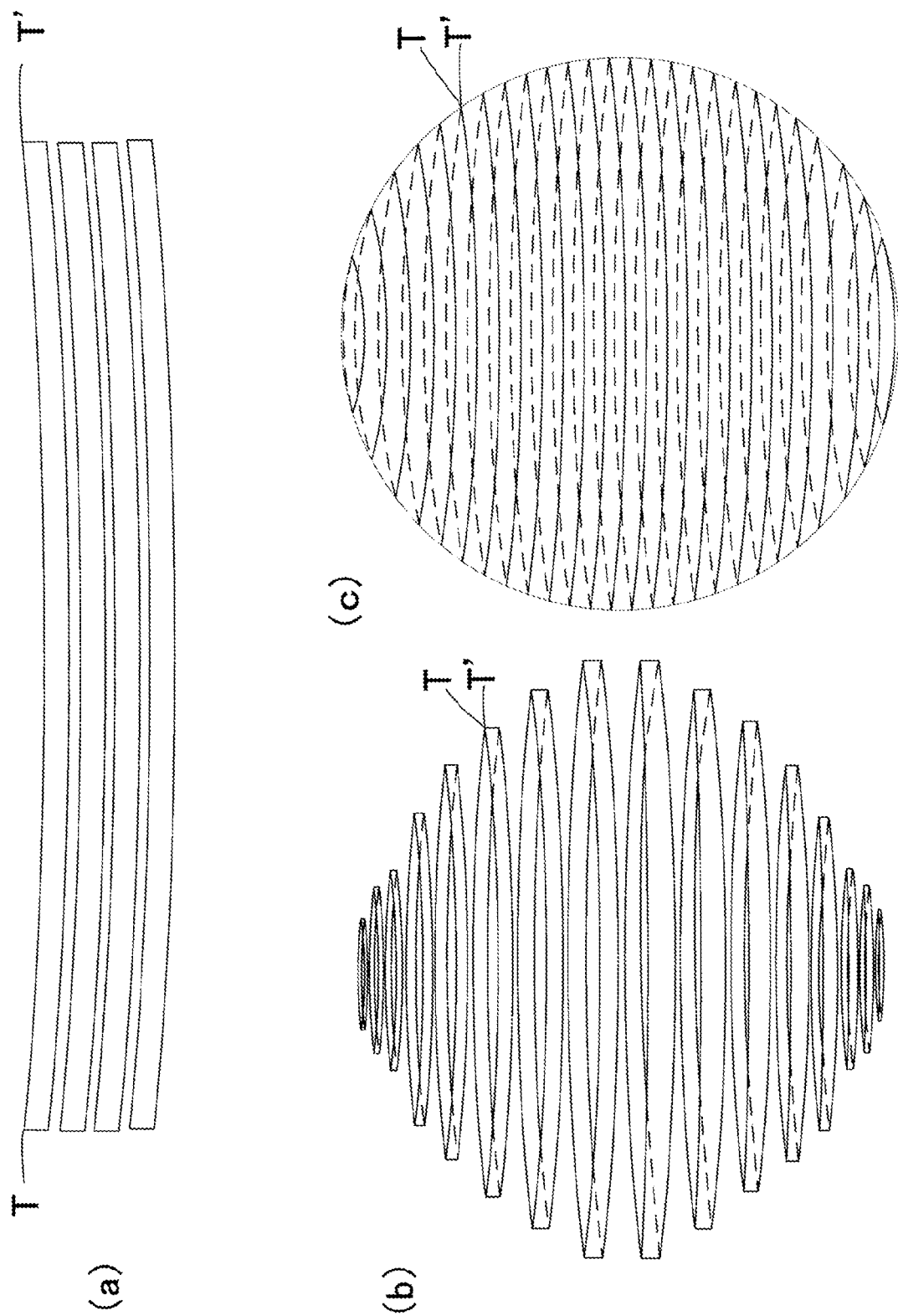
FIG. 11 is a figure describing a method for forming of the stream dot-pattern on the curvilinear solid.
Figure 12:
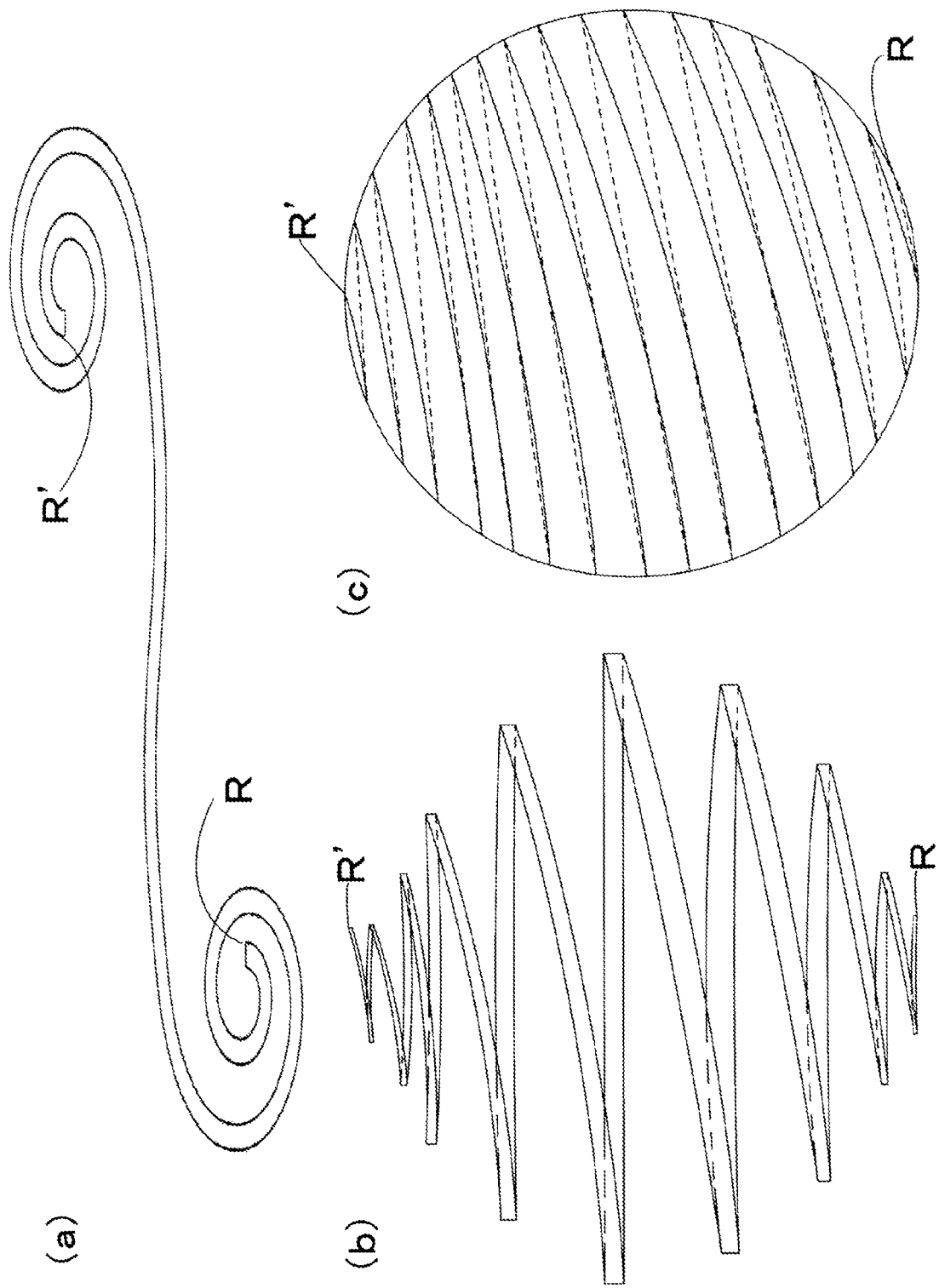
FIG. 12 is a figure describing a method for forming of the stream dot-pattern on the curvilinear solid.

FIG. 10 (a), FIG. 11 (a), and FIG. 12 (a) are figures showing an example of a medium on which a dot-pattern before being pasted on a curvilinear solid is formed, and is each formed in a belt-like shape, and in a belt-like shape with a skin of an apple stripped in a spiral fashion.

According to these shapes, after a width and length of a belt-like medium corresponding to the length of a curvilinear solid, an area size where information is wanted to be defined or the like are grasped in advance, a dot-pattern can be formed on the medium, and by that a belt-like medium is pasted to a curvilinear solid, it becomes possible to form a plurality of dot-patterns in a connected manner on the curvilinear solid surface in a belt-like shape.

In addition, even if direct printing on the curvilinear solid is not carried out, it becomes possible that on the surface of the curvilinear solid, a plurality of dot-patterns are connected and formed in a spiral fashion and/or in a ring shape.

That is, by that on one sheet of belt-like medium, a plurality of stream dot-patterns are connected and printed in a belt-like shape to be wound and pasted on the surface of the curvilinear solid in a spiral fashion without space, without carrying out printing directly on the curvilinear solid, the curvilinear solid on which a belt-like dot-pattern is formed in a spiral fashion can be created easily. A belt-like print media at the time of carrying out pasting in a spiral fashion has a shape like a skin which is stripped in a spiral fashion from fruits such as an apple, and a stream dot-pattern is connected and formed in a belt-like shape on one medium which is not separated, and may be formed on the whole surface of the curvilinear solid. As a matter of course, two or more sheets may be printed, and may be connected to be pasted.

Besides, a width of the belt-like print medium, and the number of stream dot-patterns printed on the belt-like print medium, or the like, can be determined arbitrarily from various conditions such as a imaging bore diameter of an optical read means, a curvature of the curvilinear solid on which pasting is performed, a usage, or the like.

In addition, a plurality of stream dot-patterns are connected and printed in a belt-like shape on two or more sheets of belt-like media, respectively, and by winding and pasting them like going around on the surface of the curvilinear solid in a ring shape without space, a curvilinear solid with a belt-like dot-pattern formed in a ring shape can be created easily without carrying out printing directly on the curvilinear solid.

However, a belt-like medium where a length, a size, and an interval of a definite information aggregation defined on a dot-pattern are definite is used to be made to go around, be wound and pasted on the surface of the curvilinear solid, and then, information may be lacking and be unable to be read at a joint. As a matter of course, a stream dot-pattern where a length, a size, an interval, and the number of a definite information aggregation defined on a dot-pattern are determined in advance from the length of the circumference of the curvilinear solid in the case where a dot-pattern is provided in a ring shape on the curvilinear solid may be printed on the belt-like medium. Thereby, in each ring, an information aggregation can be made to be definite, and it becomes possible to form a dot-pattern without distortion.

FIG. 10 is a figure showing an example where a medium on which a plurality of stream dot-patterns are connected to be formed in a belt-like shape is pasted only on an area on the curvilinear solid where information is wanted to be inputted and outputted.

In the case of pasting a medium as shown in FIG. 10 (*a*) on a curvilinear solid, first, calculated is a length from a point S to a point S' of illustration examples in FIG. 10 corresponding to an area size where information is wanted to be inputted and outputted, and based on the length, the number of an areas constituting a dot-pattern, a reference dot interval, a size of a dot itself, or the like are modified variously, and a length, a size, or the like of a dot-pattern are expanded/compressed. Then, a plurality of dot-patterns modified in such way are connected and provided on a belt-like medium. In this manner, accurate reading of a dot-pattern in a point R or in the vicinity of point R' is secured.

FIG. 11 is a figure showing an example where a medium on which a plurality of stream dot-patterns are connected and formed in a belt-like shape is wound and pasted on the circumference of the curvilinear solid, and in the present illustration example, an example where pasting is carried out in a ring shape in the circumference direction is shown.

In the case where a medium as shown in FIG. 11 (*a*) is pasted on a curvilinear solid by a method as shown in FIG. 11 (*b*), a length from a point T to a point T' of an illustration example in FIG. 11 corresponding to the length of the circumference of the curvilinear solid is calculated first, and based on the length, the number of an areas constituting a dot-pattern, a reference dot interval, a size of a dot itself, or the like are modified variously, and a length, a size, or the like of a dot-pattern are expanded/compressed. Then, a plurality of dot-patterns modified in such way are connected and provided on a belt-like medium. In this manner, after a distortion of dot-patterns in a joint part has been prevented, both ends of the belt-like medium are jointed together while being pasted on a curvilinear solid, and the belt-like medium is formed on the surface of the curvilinear solid as a ring-shaped medium.

Then, as shown in FIG. 11 (*c*), the belt-like medium is arranged without space, and even if any position is read, the input/output of the information becomes possible. Besides, in the vicinity of a polar zone, a mechanism or the like for being connected with a pedestal is provided, and a part on which a ring-shaped medium cannot be pasted is covered by this mechanism, or a round form medium may be pasted on the part.

FIG. 12 is a figure showing an example where a medium on which a plurality of stream dot-patterns are connected and formed in a belt-like shape is wound and pasted on the circumference of the curvilinear solid, and in the present illustration example, an example where pasting is carried out in a spiral fashion is shown.

Similarly also in the present illustration example, a length from a point R to point R' of a medium shown in FIG. 12 (*a*) is calculated in advance, and the number of an areas constituting a dot-pattern, a reference dot interval, a size of a dot itself, or the like are modified variously, and an error at the joint part is dissolved by the length of the dot-pattern being expanded/compressed, and the dot-pattern such as this is formed on the medium of a shape like a skin which is stripped in a spiral fashion from an apple. After that, the medium is wound in a spiral fashion and formed on the surface of the curvilinear solid as shown in FIGS. 12 (*b*) and 12 (*c*).

Then, a definition method of a surface position of a curvilinear solid will be described with reference to FIG. 13 to FIG. 19.

Figure 13:
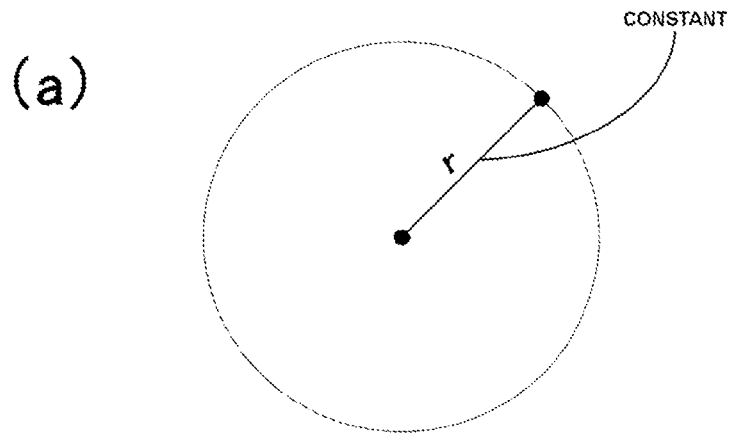
FIG. 13 is a figure showing an example of a radius index from a curvilinear solid center.
Figure 13:
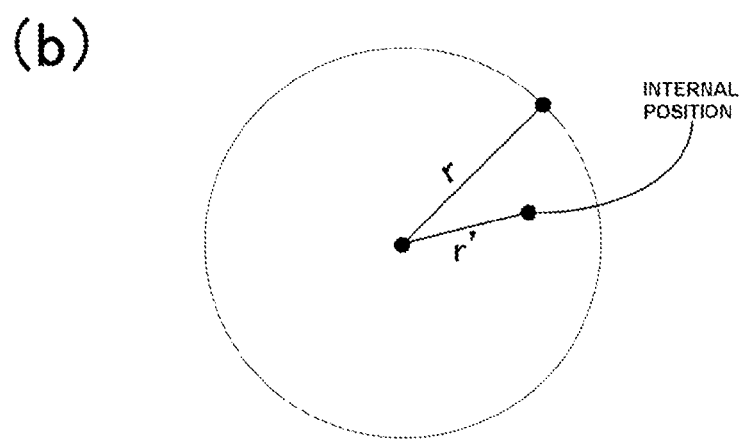
Figure 13:
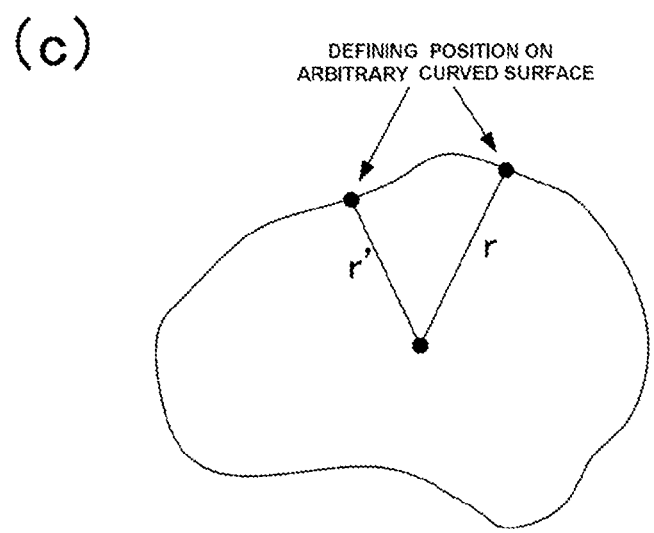

FIG. 13 is a figure showing an example of a radius index from a curvilinear solid center, which is added to a latitude index and a longitude index, for defining a position on a surface of a curvilinear solid (sculptured surface body) of which radius is not constant.

(a) is a figure showing the radius index of the curved surface of the curvilinear solid of which radius is constant, (b) is a figure showing the radius index in an internal position of the curvilinear solid of which radius is constant, (c) is a figure showing the radius index which defines a position on an arbitrary curved surface of the sculptured surface body.

Besides, as for a radius index in (b) and (c), a regularity is not necessary to be provided to a value defined by an adjacent definite information aggregation like r and r'.

In addition, the latitude index (iDX) has an index on the equator defined as 0, and for every definite information aggregation, is increased and decreased by +1 for the north direction, and by −1 for the south direction, respectively. Besides, the index on the north side by 1 from the equator is defined as 1, and the index on the south side by 1 is defined as −1.

In addition, the longitude index (jDX) has an index on a prime meridian defined as 0, and is increased and decreased by +1 for the east direction, and by −1 for the west direction, respectively. Besides, the index of the east side first definite information aggregation from the prime meridian is defined as 1, and the index of the west side is defined as −1.

The latitude/longitude information defined by the dot-pattern of the present invention are each expressed by the latitude index, the longitude index and the radius index.

Figure 14:
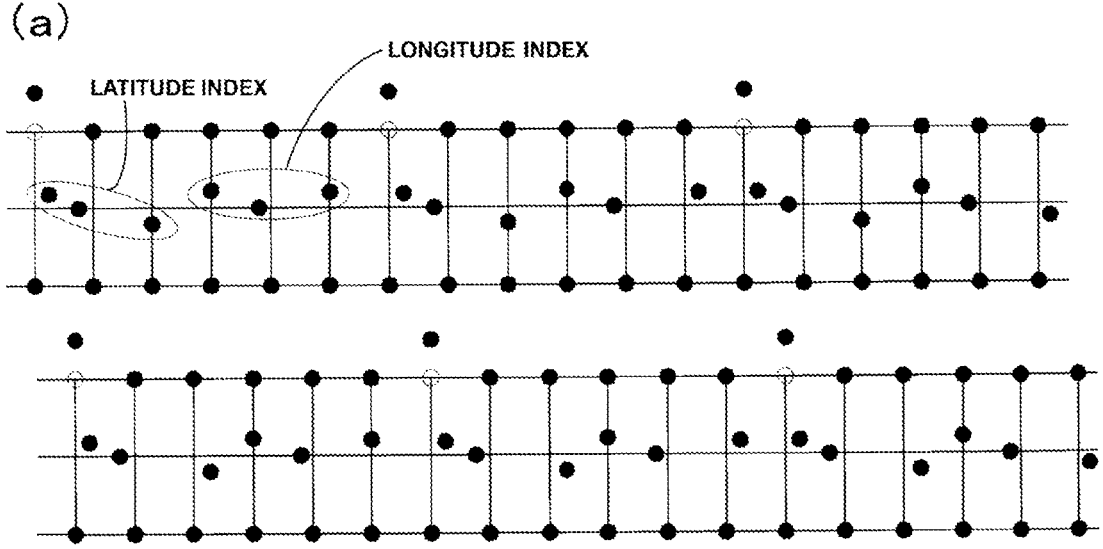
FIG. 14 is a figure showing an example of the dot-pattern used for a terrestrial globe.
Figure 14:
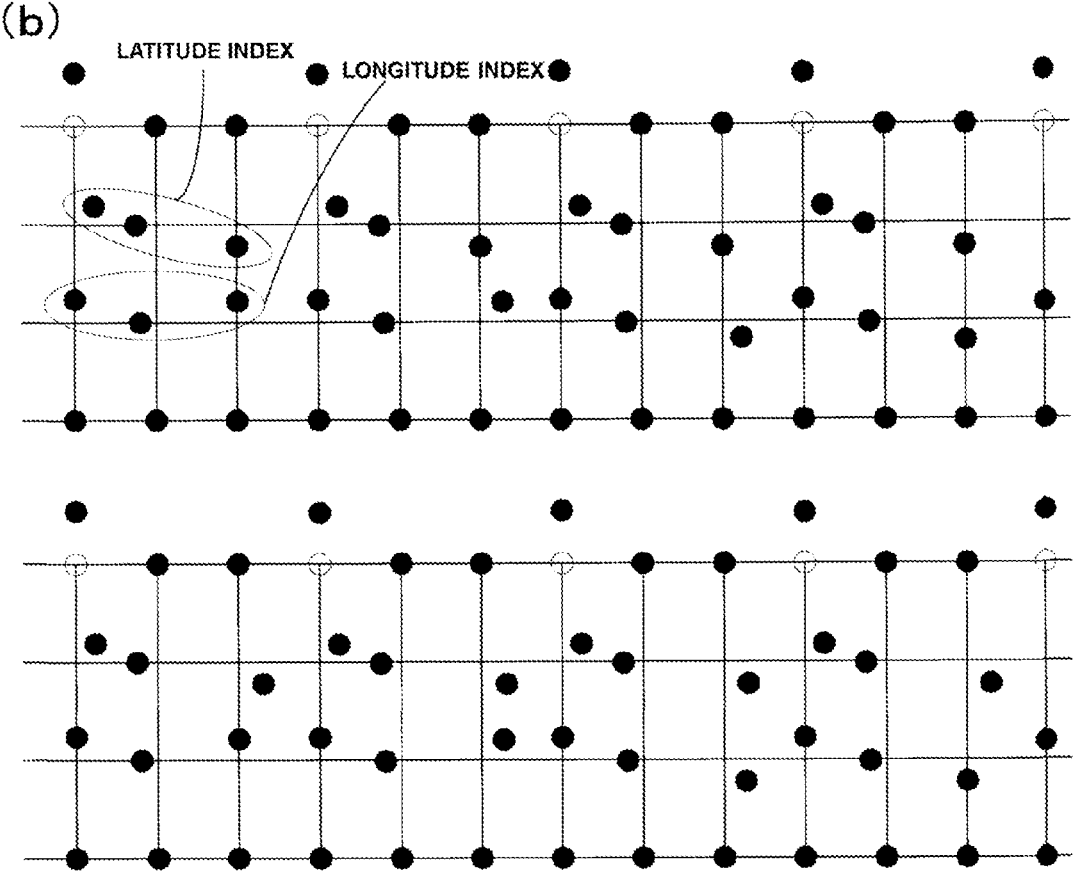
Figure 15:
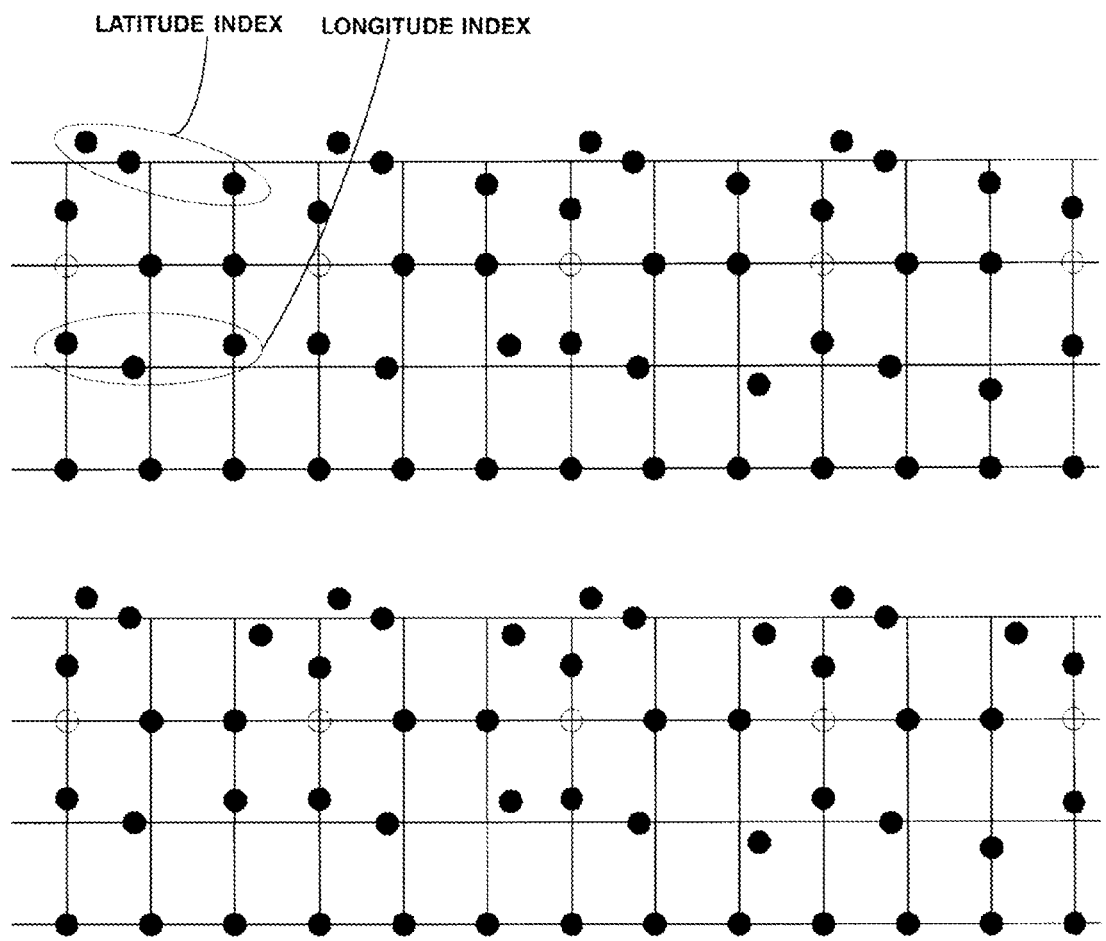
FIG. 15 is a figure showing an example of the dot-pattern used for the terrestrial globe.

FIGS. 14 (*a*) and (*b*), and FIG. 15 are figures showing an example of a dot-pattern used for a terrestrial globe, and showing examples where the above-mentioned latitude index and longitude index are defined. As for the terrestrial globe, since the surface position can be defined based on the latitude/longitude changing regularly, the surface position can be defined by a method different from the method for the sculptured surface body (without using a radius index).

In FIG. 14 (a), each of dot-patterns which are continuous in a belt-like shape in a circumference direction is constituted by 2×6 areas, and reference dots are arranged at equal intervals in the upper and lower stage of the dot-pattern, and in the middle stage, arranged is the information dot which defines information based on the virtual reference point and the distance and direction from the virtual reference point.

In FIG. 14 (b), each of continuous dot-patterns is constituted by 3×3 areas, and reference dots are arranged at equal intervals in the upper and lower stage of the dot-pattern, and in the middle two stages, arranged is the information dot which defines information based on the virtual reference point and the distance and direction from the virtual reference point.

In FIG. 15, each of dot-patterns where a plurality of definite information aggregations are connected is constituted by 3×3 areas, and reference dots are arranged at equal intervals in the middle and upper stage and in the lower stage, of the dot-pattern, and in the upper stage and in the middle and lower stage, arranged is the information dot which defines information based on the virtual reference point and the distance and direction from the virtual reference point.

In this manner, the virtual reference point and the information dot can be arranged in various positions based on the position at which the reference dot is arranged, and thereby, it becomes possible to form a dot-pattern in a free position in accordance with an area on the medium surface where information is wanted to be inputted and outputted.

On the above-mentioned information dot, as shown in the figure, a latitude-index longitude index are defined.

Then, with reference to FIGS. 14 (a), (b), and FIG. 15, a calculation procedure in the case of having imaged a dot-pattern will be described.

First, analysis is started in the brightest area within an imaged image.

Then, the latitude of the imaging center is calculated. As the procedure, (x) from 3 information dots with a latitude index defined which are contiguous in the circumferential direction, the latitude indexes are read, (y) the latitude of the center of the area having the imaging center is calculated, and (z) the calculated latitude is complemented based on the south-north distance from the center of the area to the imaging center, and the latitude of the imaging center is calculated.

Then, the longitude of the imaging center is calculated. As the procedure, (x) from 3 information dots with a longitude index defined which are contiguous in the circumferential direction, the longitude indexes are read, (y) the longitude of the center of the area having the imaging center is calculated, and (z) the calculated longitude is complemented based on the east-west distance from the center of the area to the imaging center, and the longitude of the imaging center is calculated.

Besides, in the case where the area is crossed by 3 information dots which are contiguous in the circumferential direction, the longitude index of the area having the imaging center is read in consideration of that longitude indexes defined on adjacent areas are increased and decreased by 1, respectively.

Figure 16:
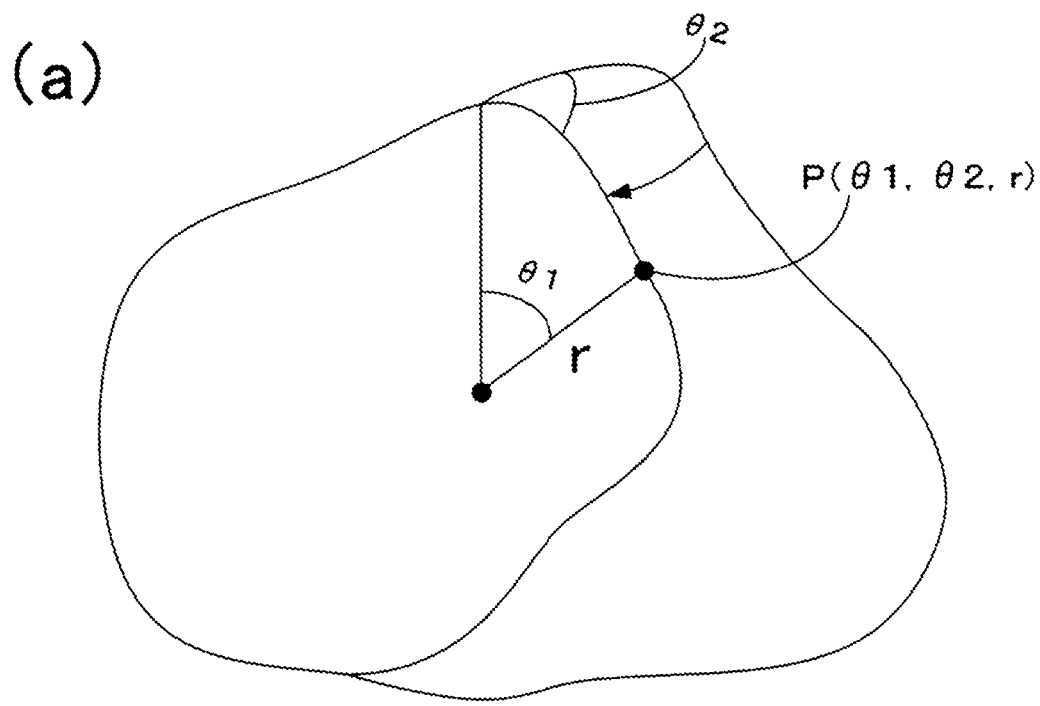
FIG. 16 is a figure describing a method of defining the index.
Figure 16:
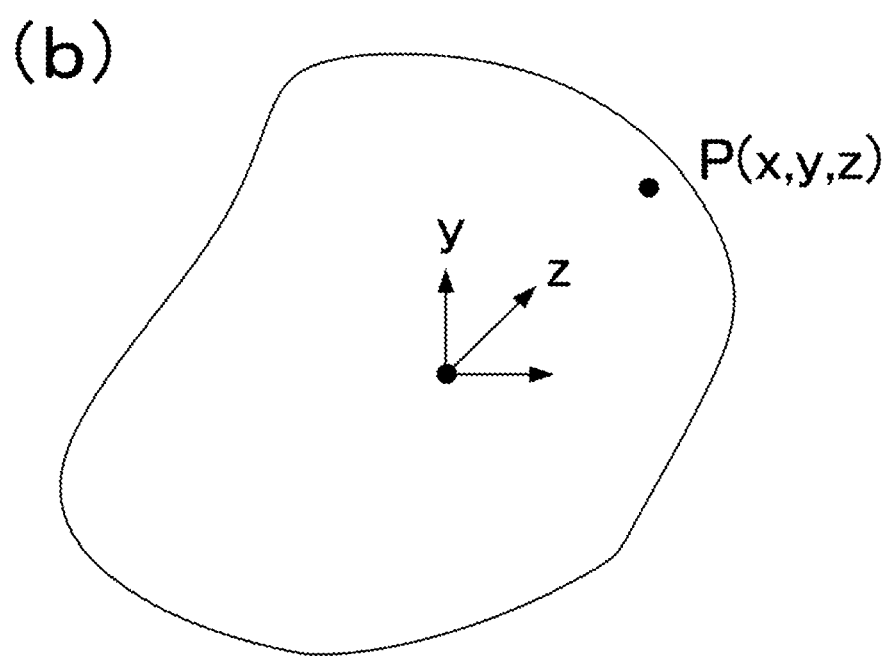

FIG. 16 is an example of a figure where a method of defining an index for defining a prescribed position P on a sculptured surface body is described.

FIG. 16 (a) is an example of a figure where the prescribed position P on the curvilinear solid is expressed based on a θ1 index, a θ2 index, and a radius index, and FIG. 16 (b) is an example of a figure expressed based on an x-coordinate index, a y coordinate index, and a z coordinate index.

The prescribed position P on the sculptured surface body can be defined based on the following methods.

First, the iDX expressing an angle of the θ1 is defined. That is, a table of iDX1-θ1 is created. At this time, the θ1 does not need to be an X coordinate.

Then, a stream dot going around at the θ1 defined in the above-mentioned table is formed on the sculptured surface body in a belt-like shape in the circumference direction continuously. On this stream dot, iDX2 expressing the iDX and the θ2 is defined.

That is, on the θ1, a table of iDX2-θ2 which is independent of other θ1 is created. Because, in the case of a sculptured surface body, by only the θ2 (jDX) independent of the θ1 (iDX), a surface position of the curvilinear solid cannot be defined, and it is necessary to make a table of iDX2-θ2 for every θ1 value.

Thereby, it becomes possible to define the prescribed position of the sculptured surface body, which has been difficult in a conventional dot-pattern.

Besides, even in the case of a curved surface where a incremental quantity does not become constant, it is preferable to define the iDX1 as θ1 index which is incremented by one. In addition, the θ1 which is incremented in an orthogonal direction to the belt-like direction of the area is defined by a table T1 (iDX1).

In addition, even in the case of a curved surface where an incremental quantity does not become constant, it is preferable to define the iDX2 as the θ2 index which is incremented by one. In addition, the θ2 which is incremented in a belt-like direction of the area is defined by a table T2IDX1 (iDX2) in the iDX1 which is the θ1 index of this area.

In addition, r is irrelevant to an arrangement of the area. However, r may be defined by a table TiDX1 (iDX3) in the iDX1 which is the θ1 index of this area so that reading may be able to be carried out even if the area is crossed, and an integer value may be able to be used efficiently.

Besides, it is because it is made to be possible for the index to be read even if the area is crossed that an increment is carried out by one in a belt-like direction of the area.

Figure 17:
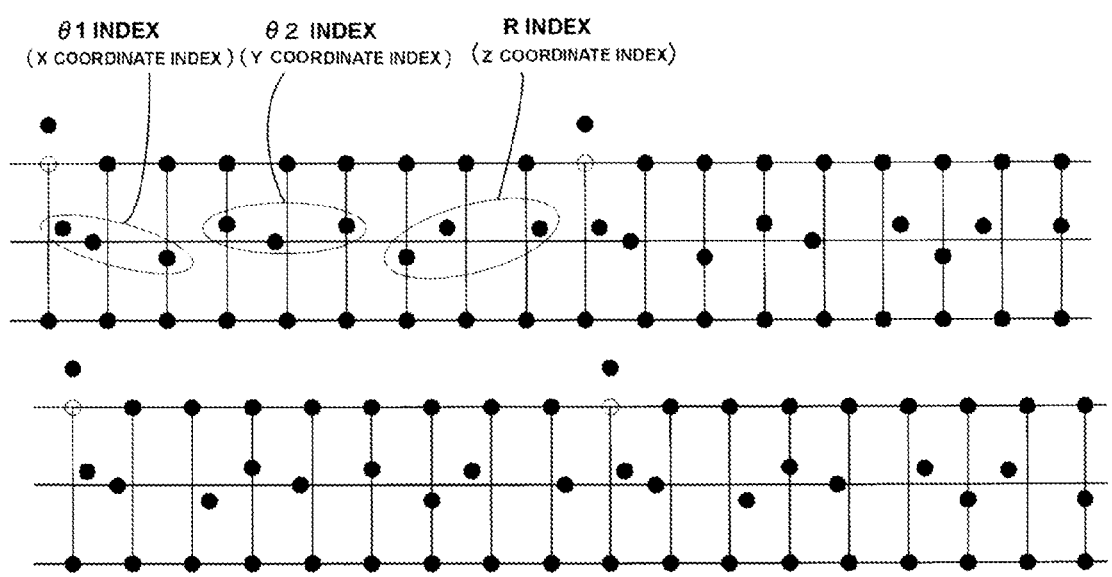
FIG. 17 is figure showing an example of the dot-pattern used for the terrestrial globe.

FIG. 17 is a figure showing an example of a dot-pattern used for a terrestrial globe.

In this example, each of continuous dot-patterns is constituted by 2×9 areas, and reference dots are arranged at equal intervals in the upper stage and lower stage of the dot-pattern, and in a central transverse direction, a virtual reference point and an information dot have been arranged.

On this information dot 3, as shown in the figure, the θ1 index (x-coordinate index), the θ2 index (y-coordinate index), and the r index (z-coordinate index) are defined.

Figure 18:
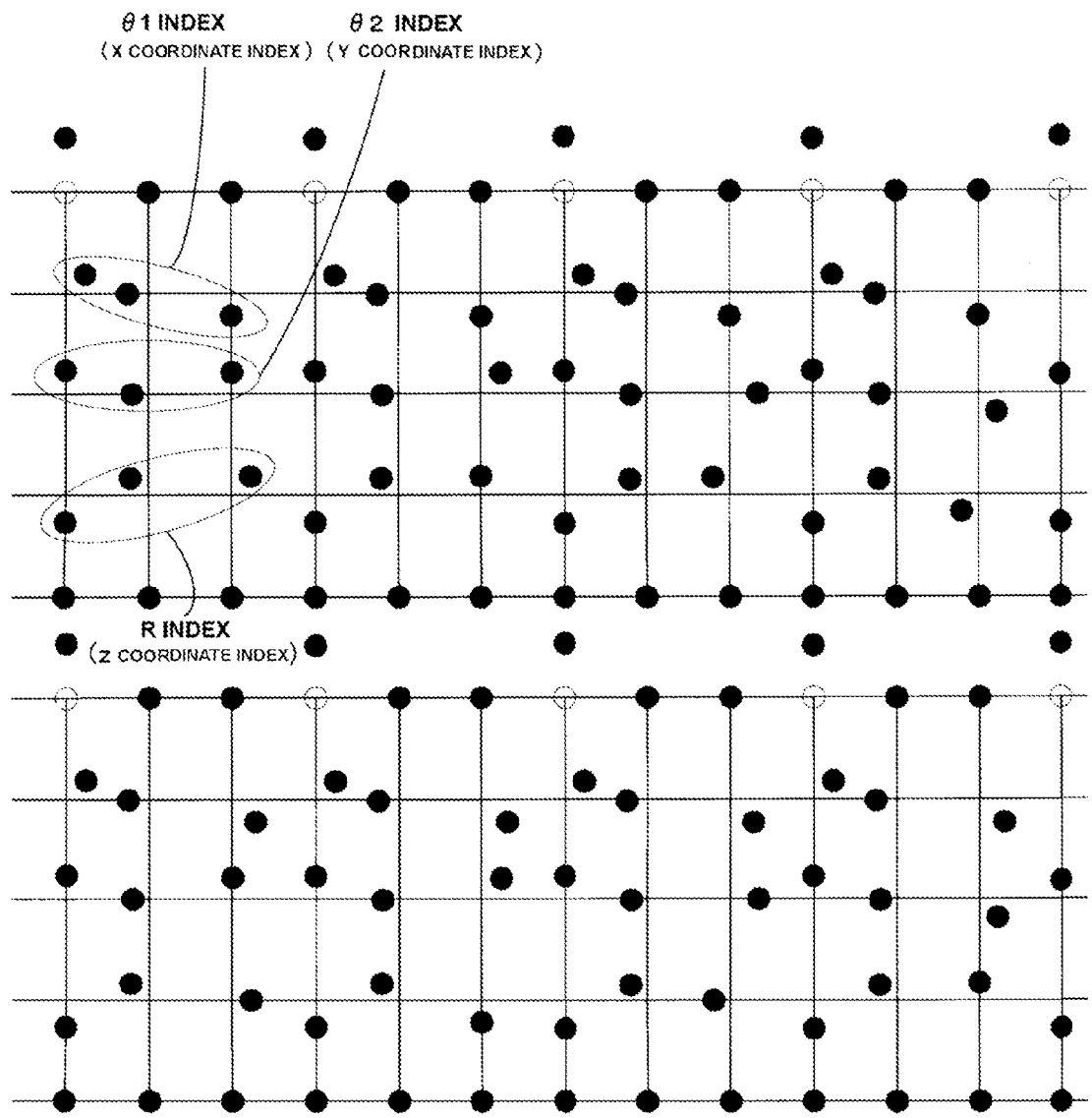
FIG. 18 is a figure showing a modification example of the dot-pattern used for the terrestrial globe.
Figure 19:
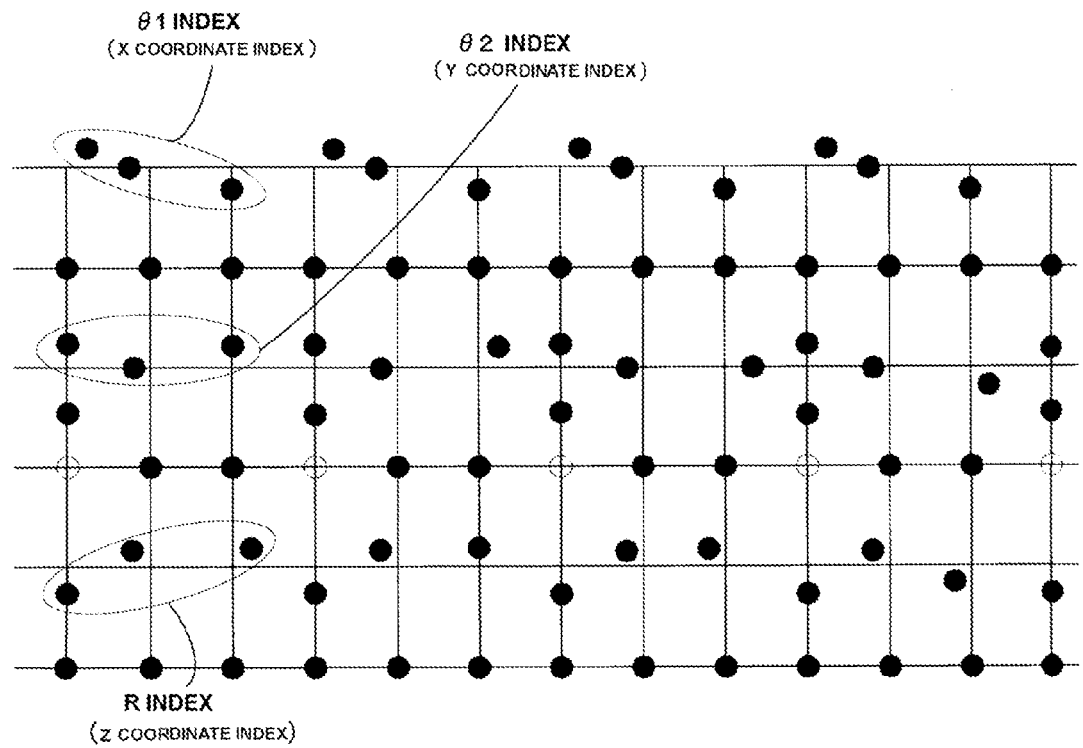
FIG. 19 is a figure showing a modification example of the dot-pattern used for the terrestrial globe.
Figure 19:
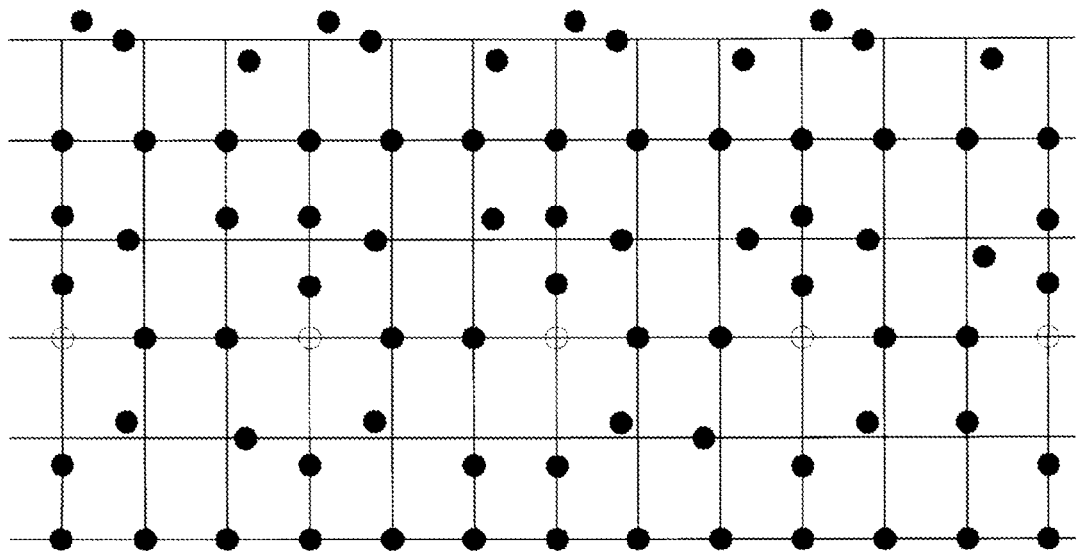

FIG. 18 to FIG. 19 are figures showing modification examples of a dot-pattern used for a terrestrial globe.

In FIG. 18, each of continuous dot-patterns is constituted by 4×3 areas, and reference dots are arranged at equal intervals in the upper and lower stage of the dot-pattern, and in a central longitudinal direction, a virtual reference point and an information dot are arranged.

In FIG. 19, each of continuous dot-patterns is constituted by 5×3 areas, and from the upper stage of the dot-pattern, the θ1 index, the reference dot, the θ2 index, the r index, and the reference dot are arranged.

In the present illustration example, dot-patterns where a plurality of stream dot-patterns are connected and formed in a belt-like shape are arranged with two rows in parallel, and however, in the case where the patterns are formed on the surface of a curvilinear solid, it is preferable that such belts are arranged so as to cover the area where information is wanted to be inputted and outputted, and are formed without space so that information may be made to be inputted from an arbitrary position.

Then, a information input/output method using a curvilinear solid for information input according to the present invention will be described with reference to FIG. 20 to FIG. 22.

Figure 20:
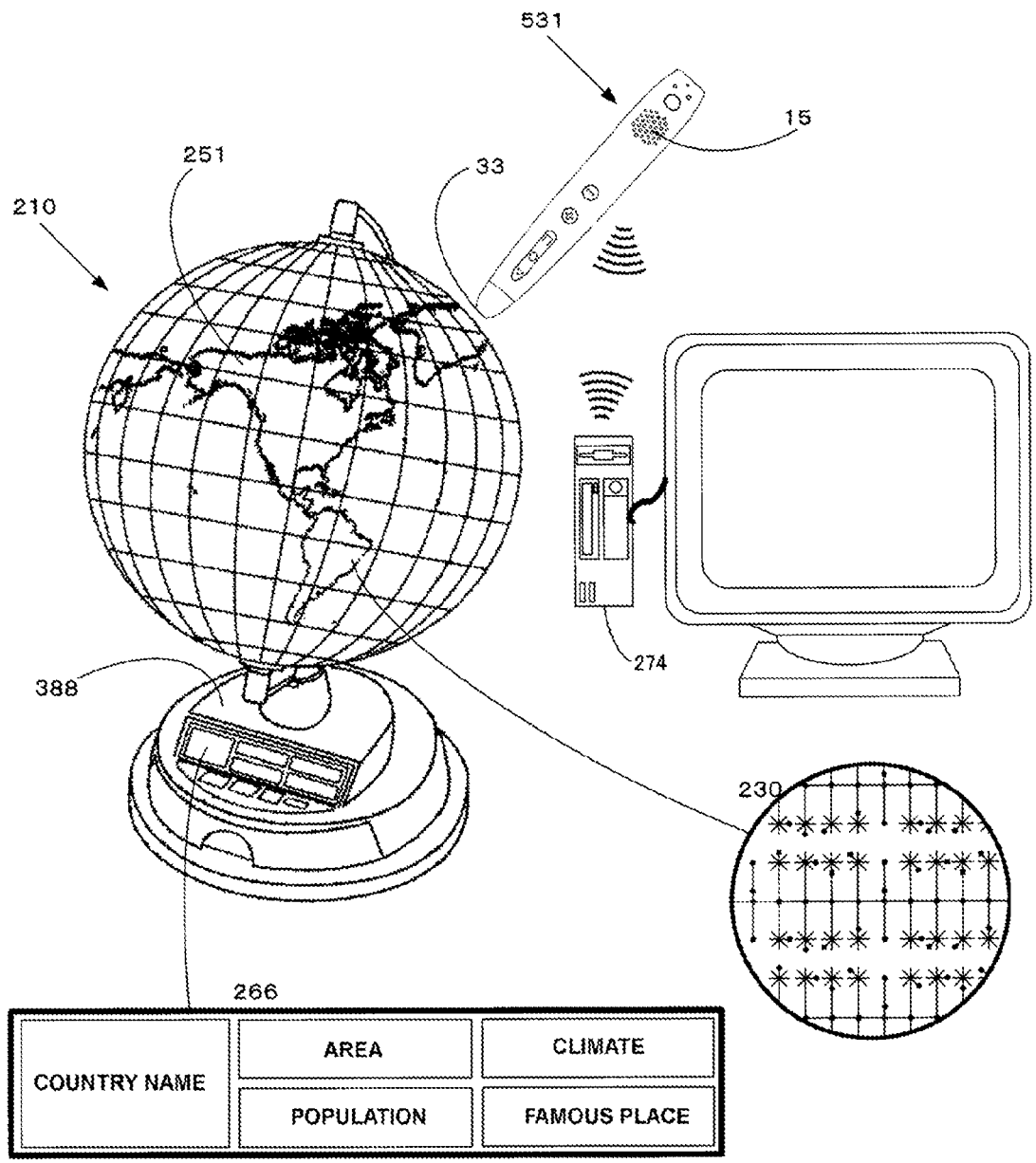
FIG. 20 is a figure showing an example of an information input/output method using the curvilinear solid for information input.

FIG. 20 shows an example of an information input/output method using a curvilinear solid for information input according to the present invention, and the information input/output method uses: a terrestrial globe 210 as a curvilinear solid for information input which is made up of an information transmission part 251 and a dot-pattern part 230; an input/output device 531 provided with an optical read means 33 which reads the dot-pattern part 230 formed on the terrestrial globe 210 and outputs corresponding information, and a microphone as an output means 15; and a pedestal 388 which constitutes a terrestrial globe and is provided with control information transmission part 266.

On the information transmission part 251, map information formed to be able to be visually identified by a user is defined, and on the dot-pattern part 230, a dot code converted into coordinate information and/or code information is defined, and in the present illustration example, the stream dot-pattern mentioned above is used.

Ink used for dot printing of a dot-pattern is preferable to be founded on stealth ink which absorbs infrared rays (invisible ink) or carbon black, and ink used for printing of a normal graphic or text is preferable to be founded on non-carbon ink which reflects or transmits infrared rays. Besides, a dot-pattern is constituted by an infinitesimal dot of 0.03 to 6 mm in diameter (in printers such as an ink jet, about 0.06 to 0.08 mm), and is hard to be visible, and if water-clear infrared absorption stealth ink developed for high-definition output is used, it is also possible to make a dot completely invisible.

The input/output device 531 is provided with a processing means, storage means and control means which are not illustrated in addition to above-mentioned optical read means 33 and output means 15. The input/output device 531 carries out analysis processing of the image data read by the optical read means 33 into a dot code by the processing means, and on the basis of the coordinate information and/or code information converted from the dot code, with reference to a link table stored in the storage means by the control means (in the link table, the coordinate information and/or code information and contents data and/or operating instructions are associated with each other and registered), will perform outputting corresponding contents data by the output means 15, or perform operation by the operating instructions.

In the control information transmission part 266, information which switches an operation of the input/output device 531 is defined visibly, and for example, in the case where a column of a country name is read, the operation of the input/output device 531 is switched, and the country name according to the information transmission part 251 will be informed of by a voice. Other than this, in addition to switching to the mode which carries out a voice output of a latitude/longitude, history and culture, it is possible to perform volume control or the like of the input/output device by a touch operation.

A dot-pattern may be superimposed and formed on the control information transmission part 266, and based on the operating instructions defined on the read dot-pattern, an operation of the input/output device 531 may be made to be switched intelligibly, and an operation may be directly switched using prescribed button operations, or the like.

Besides, the terrestrial globe in the present invention may be not only a general one which supports a curvilinear solid at the poles with a support part provided on a pedestal, and rotates the curvilinear solid with the axis connecting the poles as a center, but also may include one which supports and floats/rotates the curvilinear solid with a magnet, and also one with a map printed on a spherical body made of firm paper or plastics, or may be one with a map printed on a spherical body like a balloon.

A user, when performing information input/output method using this terrestrial globe, switches an operation of the input/output device 531 by reading the control information transmission part 266 first. That is, the user, among contents data corresponding to the position where the information transmission part 251 has been read, determines which type of contents data is made to be outputted by reading the control information transmission part 266 and the dot-pattern part 230 which has been superimposed and printed thereon. When touching the information transmission part 266 in the vicinity of Japan with the input/output device, the dot-pattern which has been superimposed and printed thereon is read, and corresponding contents data are outputted. In the case where the input/output device 531 is in a country name output mode, a voice of "Japan" or "JAPAN" or the like, will be outputted, and in the case of a famous-place output mode, a voice such as "Kyoto" or "Mt. Fuji" will be outputted.

Besides, a voice output and reference to a link table or the like are also possible to be performed by a personal computer 274 or the like connected with the input/output device 531 via a wireless or a cable. In this case, a reference to the link table is not performed in the input/output device 531, the coordinate information and/or code information will be transmitted to the personal computer 274. However, the personal computer 274 may perform the reference to the link table only, and the input/output device 531 may perform voice output.

A user will touch any of arbitrary positions on the terrestrial globe 210 after switching an operation using the input/output device 531. According to the present invention, since not only the code information, but also coordinate information (latitude/longitude information) will be able to be defined, more detailed contents data will be able to be defined on the terrestrial globe 210.

For example, in the case where a stream dot-pattern formed on the terrestrial globe is read twice, a usage such that the distance between the two points, a difference of a population, an air temperature difference, or the like are made to be outputted via a voice or the like will be possible. Besides, since the information is defined based not on existence/not-existence, but on a prescribed rule, it will become possible to dissolve a moire which is a streaky periodic pattern, and which is generated by that a part where a dot is formed and a part where a dot is not formed interfere with each other.

Since a stream dot-pattern is formed on the terrestrial globe 210, the latitude/longitude information and code information of the read center position are analyzed by the above-mentioned method, and with reference to the link table stored in the storage means by the control means, a corresponding contents data are outputted from the output means 15.

Besides, in the case where contents data are not stored in a storage means of the input/output device, the storage means which stores contents data and the output means are provided on the terrestrial globe 210, and the contents data may be outputted by the terrestrial globe 210 itself, as a matter of course. The connection with the terrestrial globe 210 is preferable to adopt, in addition to the connection by a cable, an infrared ray communication, BLUETOOTH®, ZigBee, and a communication connection based on a wireless method using a very weak radio wave, in the same way as the connection with the personal computer 274.

In this manner, by defining latitude/longitude information and/or regional information, from the code information defined on areas such as the symbols and place names printed on a terrestrial globe, a star globe and a celestial globe, a descriptive text, an image, a moving image and voice information or the like, of these symbols and place names or the like can be outputted from a display device, a loudspeaker, or the like, and from the latitude/longitude on the terrestrial globe, the star globe or the celestial globe, the corresponding temperature and climate, a concentration of $CO_2$ or the like and various information based on the region, will be possible to be made to be outputted from the display device. Besides, in the area where the area with the code information defined thereon and the latitude/longitude with associated information allocated thereto overlap, the associated information can be switched and outputted by a prescribed method.

Then, with reference to FIG. 21 to FIG. 22, an example of a format of the dot code and the coordinate information and/or code information will be described.

Figure 21:
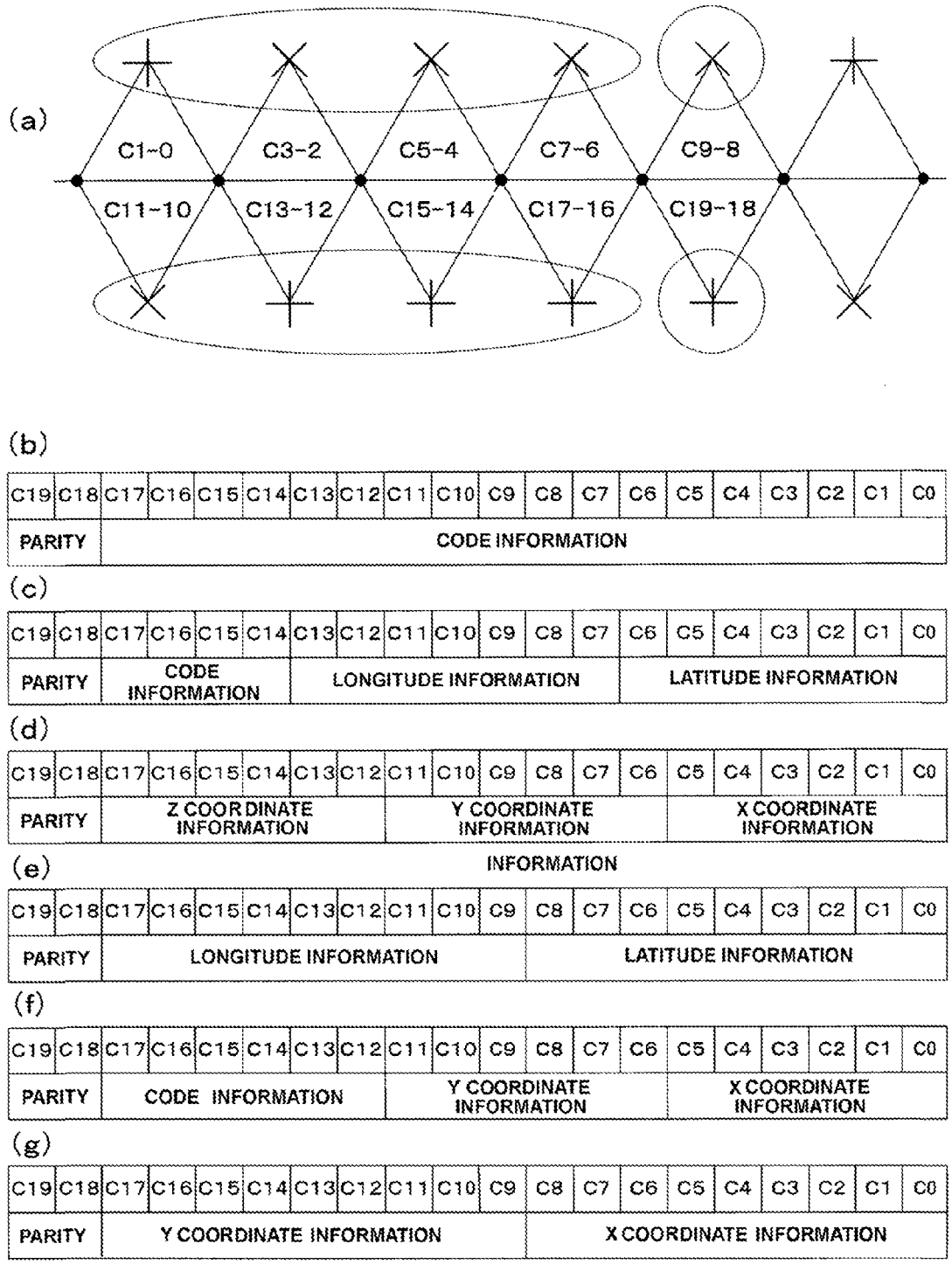
FIG. 21 is a figure showing an example of a dot code format.

A dot-pattern illustrated in FIG. 21 (*a*) is one where a definite information aggregation is constituted by 2×5 areas, and is divided into C1-0 to C19-18 in the definite information aggregation. It is FIG. 21 (*b*) that shows a dot code format of each area.

FIG. 21 (*b*) shows a case where the dot code is constituted by only the code information (parity is excluded), and in C0 to C17, the code information for every dot code of the dot-pattern of each area shown in FIG. 21 (*a*) is registered. Then, in C18 to C19, a parity check is configured to be registered.

In addition, in FIG. 21 (*c*), the latitude/longitude information together with the code information is configured to be registered. If the latitude/longitude information is used for the curvilinear solid including the terrestrial globe, the star globe, and the celestial globe, and if the code information and the regional information have been made to be linked with each other in a link table, various regional information can be inputted and outputted on the basis of the latitude/longitude information and code information defined on the position read by a scanner. In the present illustration example, the latitude information in C0 to C6, the longitude information in C7 to C13, and the code information in C14 to C17 are each configured to be registered.

FIG. 21 (*d*) shows a format where Z coordinate information together with XY-coordinate information are registered, and the dot-pattern of the present invention is possible to have a format which is rich in flexibility like a case where only the code information is registered, a case where the code information and the XY-coordinate information are registered, and a case where the Z coordinate information together with the XY-coordinates information are registered. The Z coordinate information is used in the case where defined is a surface position of the curvilinear solid which cannot be defined by only the XY-coordinate information, and of which radius is not constant.

Besides, the code information means an active code and/or an index, and the active code indicates a processing method, and the index indicates a prescribed area, and they are associated with each other in the link table.

In addition, a coordinate index is included in indexes, and the coordinate index is an area where the page number or the like of a paper which is a medium is registered, and an identifier and page number which identifies a medium itself where the XY-coordinate information is registered as a dot-pattern, can be registered therein.

FIGS. 21 (*e*) to (*g*) are figures showing other modification examples of the format.

In the XY-coordinate information and code information defined on an area touched with a scanner, in the case where the medium is a drawing for information input, for example, a plurality of various associated information such as a type, product number, specification, a color, a pattern, a quality of material, material, fittings, a fabrication method, a constructing method, a working schedule, or the like of an object which will be a design object, are linked and registered.

Other than this, it is also possible to register in the link table design information such as machinery, construction, construction equipment and an electric system, and instructions for performing various displays on the display device.

In the case where a medium is a map for information input, various traffic information such as a name, a rate of congestion, and a lane number, and digital map information in the vicinity of the read position, and store information in the surrounding area are registered in the link table in association with the code information or the XY-coordinate information.

Then, with reference to FIG. 22, a relation among a dot-pattern, a code value, and an identifier will be described.

Figure 22:
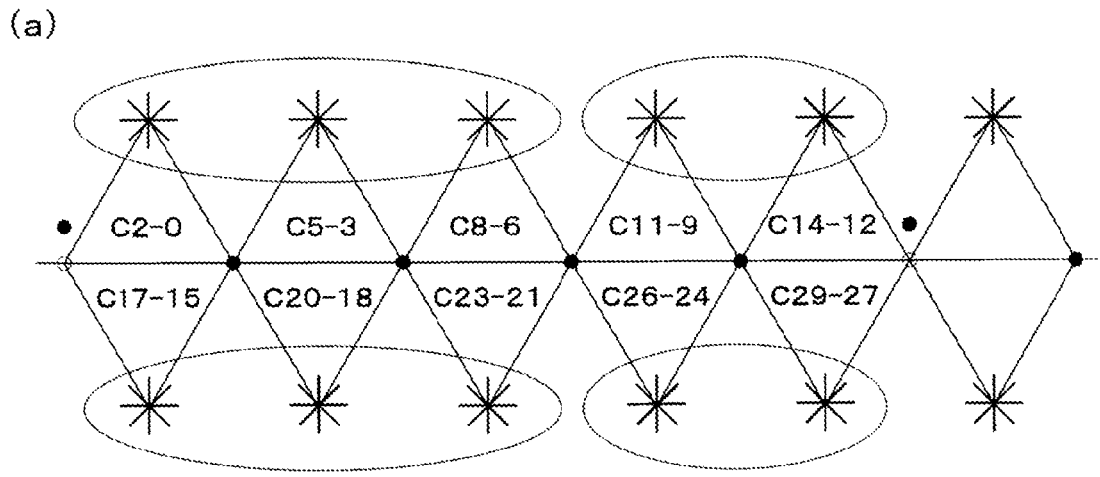
FIG. 22 is a figure showing an example of the dot code format.

A dot-pattern described in FIG. 22 (*a*), unlike one in which the definite information aggregation and direction of a dot-pattern are defined based on the displacement direction from the virtual reference point of the information dot as described in FIG. 21 (*a*), since the definite information aggregation and direction of the dot-pattern are defined by arranging the prescribed dots (a key dot, a side dot), can be made to have displacements in 8 directions for one information dot, that is, an information amount of 3 bits.

FIG. 22 (*b*) shows a case where the dot-pattern is constituted by the XY-coordinate information, the code information, and the parity, and the X coordinate information in C0 to C8, the Y coordinate information in C9 to C17, and the code information in C18 to C27 are configured to be registered.

In FIGS. 22 (*f*) and (*g*), indicated is a format in the case where other coordinate system such as a spherical coordinate system and a cylindrical coordinate system are used in place of the code information or the XY-coordinate information, and a position on a curvilinear solid for information input is defined from a radius r, an angle θ, a height h, or the like.

In this manner, using the dot-pattern according to the present invention, not only the XY-coordinate information, but also the Z coordinate information and the other coordinate system (for example, the cylindrical coordinate system, the spherical coordinate system, the latitude/longitude) can also be dealt with.

Besides, FIG. 22 (*c*) to FIG. 22 (*e*) or the like can be considered as other format modification examples. However, a configuration of such format is not limited to what are illustrated, and as a matter of course, can be modified freely within the scope of the present invention.

Then, an information input/output method using a map for information input according to the present invention will be described with reference to FIG. 23.

This embodiment is one where a map is configured to be a medium, and when the map is imaged with a pen type scanner (optical read means), information (voice) corresponding to the imaged contents is configured to be outputted from the output means.

Besides, the display device or the like is made to be connected to this input/output device, and a digital map installed in a personal computer and a character, a figure, a voice, a moving image or the like corresponding to it may be made to be displayed on this display device.

Figure 23:
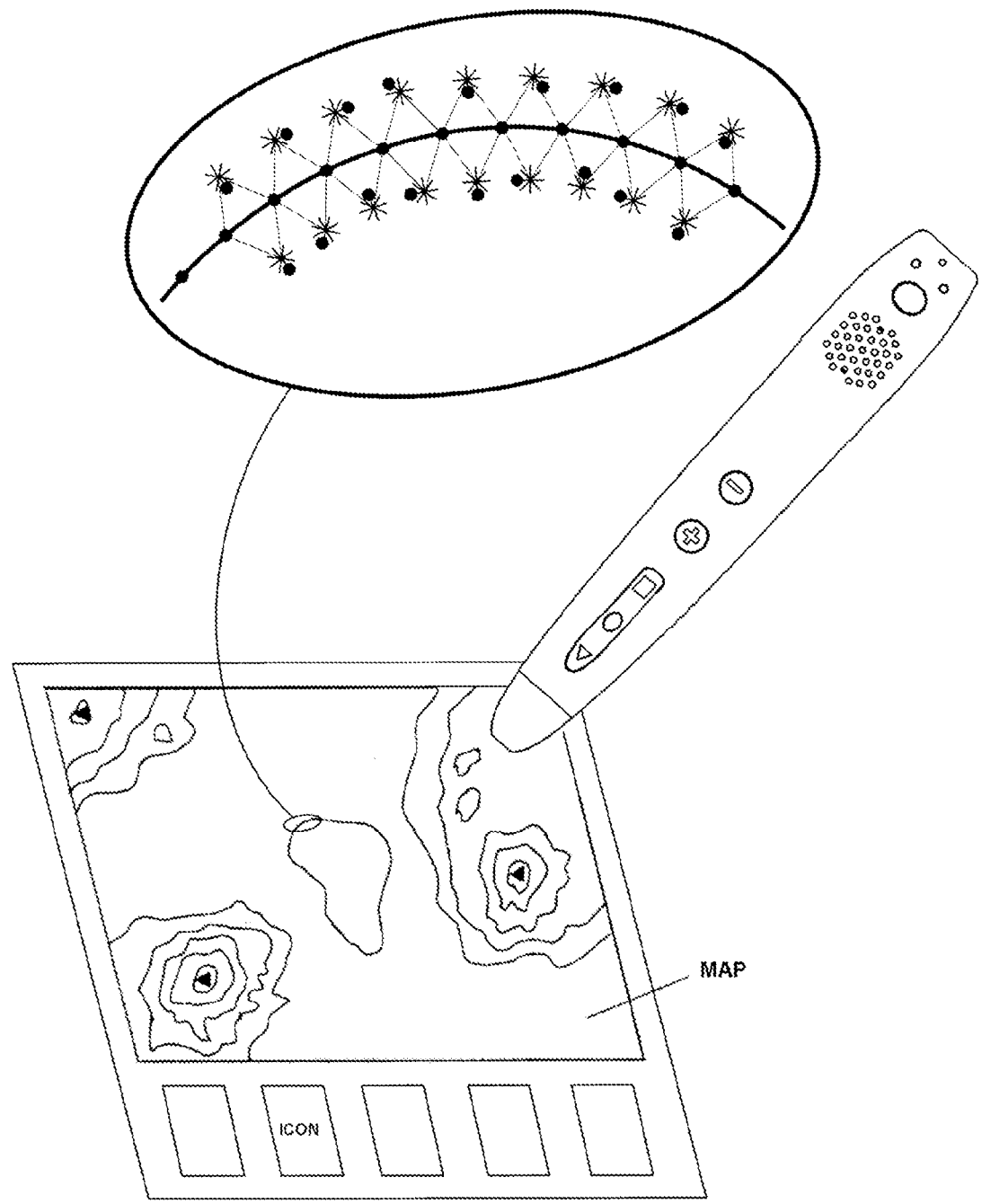
FIG. 23 is a figure describing an information input/output method using a map for information input.

FIG. 23 shows an example of the information input/output method using the map for information input according to the present invention. On the map, a contour line as a visible isopleth line which connects points where a value of a prescribed parameter is equal, and a map part where a road, a railway line, tourist facilities, or the like which are not shown are printed are provided, and an icon section where icons for switching various operations on the display device or the input/output device are printed is formed in the other position on the medium.

On the area of each icon in the icon section, a dot-pattern which means a code corresponding to an operation instruction is printed, and however, the dot-pattern printed here is not limited to the stream dot-pattern mentioned above. It may be the dot-pattern having a rectangular shape used conventionally, for example, the dot-pattern where, within an area of a block where the information dot is arranged, a plurality of reference points which define a size and direction of the block are provided, and a plurality of virtual reference points defined from the reference points are arranged, and the information dot where information is defined based on the distance and direction from said virtual reference point is arranged.

On the contour line in the map part, the stream dot-pattern mentioned above is printed.

That is, as the first process mentioned above, a plurality of reference dots are arranged contiguously in a line form on the visible contour line (a part where information is wanted to be inputted and outputted) on the medium surface, and as the second process, the first virtual reference line which connects the reference dots arranged in a line form is provided so as to be superimposed on the contour line.

Besides, the reference dots are contiguously arranged in a line form on both sides of the isopleth line, and on the center line thereof, i.e., on the isopleth line, the second virtual reference line and the virtual reference points may be defined.

Thereby, the stream dot-pattern can be arranged along the isopleth lines expressed visibly in order to indicate various information including a contour line, a constant-pressure line, an isotach, and a constant-temperature line or the like, and the coordinate information and/or the code information can be read even at any arbitrary position using the optical read means.

Here, by that the value of the isopleth line is defined on the code information, or associated information is made to be linked with the code information, a grid map (a tentative name of the map using a dot-pattern) which is excellent in convenience can be provided.

Then, an information input/output method using a map for information input according to the present invention will be described with reference to FIG. 24.

On the map in this embodiment, various lines indicating traffic information including an outline which indicates a width of a road, a center line indicating the road, a character and character string, are provided visibly, and the center line indicating the center of the road is defined virtually.

Figure 24:
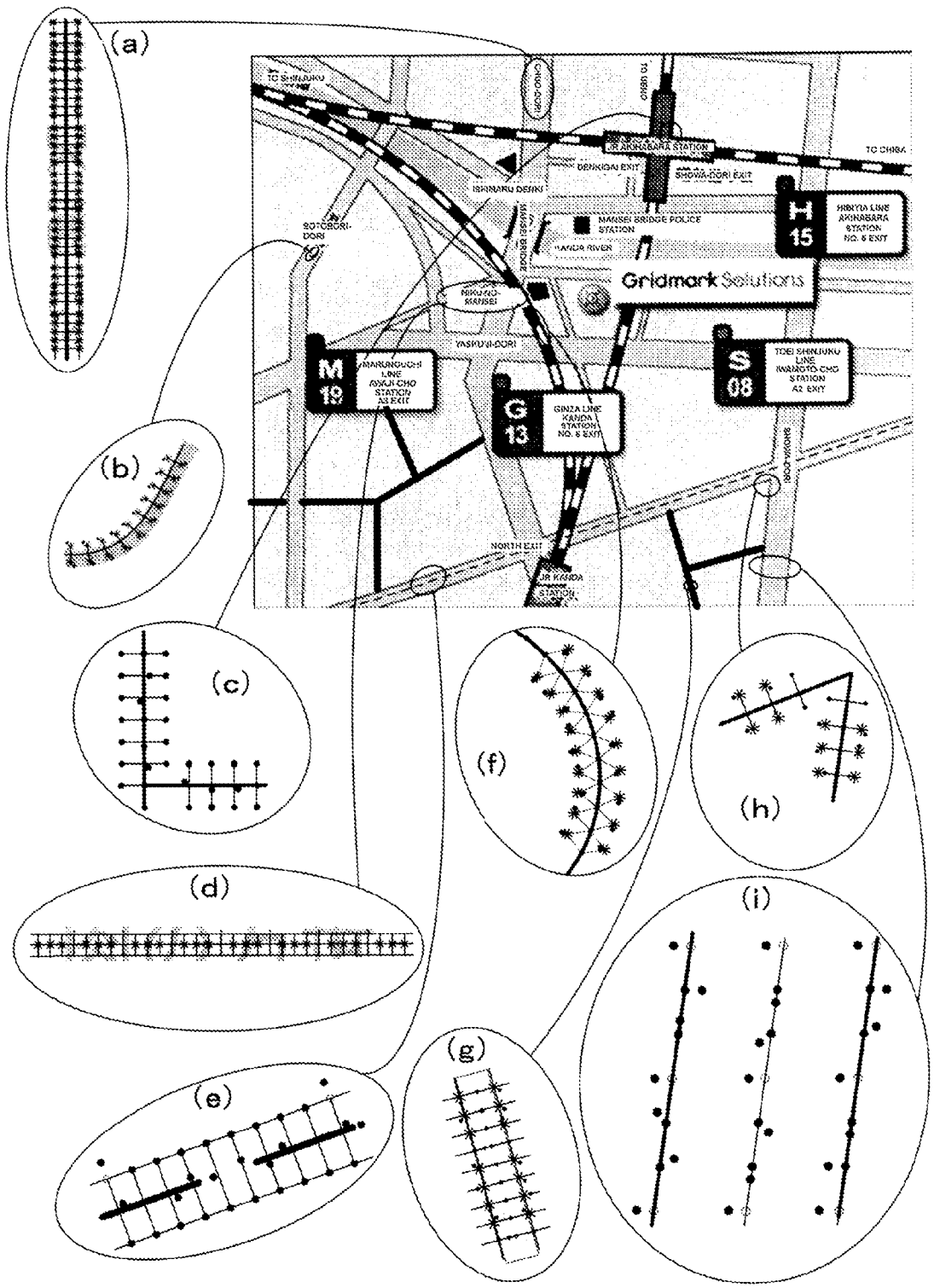
FIG. 24 is a figure describing an information input/output method using a map for information input.

In addition, on these lines, a plurality of reference dots are contiguously arranged at the prescribed intervals, and the first virtual reference line which connects the reference dots arranged in a line form is defined, as shown each in the illustration example in FIG. 24, on the various lines indicating the traffic information, or on the virtual center line indicating the center of the road, including on the outline indicating the width of the visible road, on the center line indicating the road, and on the character and character string.

Besides, as shown in an illustration example in FIG. 24 (e), the reference dots are not arranged on the center line which is made up of dotted lines and indicates the road, and the reference dots may be provided in a line form along the center line, and the first virtual reference line may be defined, and the second virtual reference line and the virtual reference points may be defined on the center line.

Thereby, it becomes possible to form the stream dot-patterns along the road or the like indicated by a straight line, a polygonal line, a curved line, a solid line, various dotted lines, a thick line, a double line or the like, and the coordinate information and/or the code information can be read even at any arbitrary position using the optical read means.

In addition, from the length of the road or the like indicated by the straight line, the polygonal line, the curved line, the solid line, the various dotted lines, the thick line, the double line or the like, it becomes possible to determine the optimal interval, number and size of the various dots in advance, and form the stream dot-pattern.

FIGS. 24 (a) and (d) are figures showing examples where the stream dot-patterns are formed on the character strings termed "Chuo-Dori" and "NIKU-NO-MANSEI", respectively, and FIG. 24 (b) is a figure showing an example where the stream dot-pattern is formed on a character of "り)".

As shown in FIG. 24 (d), since the stream dot-pattern is formed on the character string "NIKU-NO-MANSEI", when a user touches an arbitrary position of this character string, information associated with this character string such as store information, parking vacancy information, or servicing information can be made to be outputted.

FIG. 24 (c) is a figure showing an example where the dot-patterns are formed along real lines indicating JR Akihabara Station which is made up of a plurality of line segments.

In the case where real lines make an angle, it is preferable to make the dot-patterns discontinuous in the vicinity of the polygonal line, as indicated in the figure.

Thereby, in the case where the dot-patterns are formed continuously, when the vicinity of an corner point is read, it becomes possible to prevent input/output of mistaken information caused by not reading information dots to be read originally, but reading of information dots arranged around it.

FIG. 24 (f) is a figure showing an example where the stream dot-pattern is formed on the real line indicating a railway line which is made up of curved lines, and FIG. 24 (h) is a figure showing an example where the stream dot-pattern is formed on the outline of the road which is made up of polygonal lines.

In addition, FIG. 24 (i) is a figure showing an example where the stream dot-patterns are each formed on two visible outlines indicating the road and on the virtual center line indicating the center of the road defined in the center of the outlines.

In the case where a width of a road is narrow, the stream dot-pattern may be formed along only the outline and information may be made to be inputted and outputted, and however, in the case where the width of the road is wide, it is preferable for the information to be able to be read by that the stream dot-pattern is formed in the center as shown in the present illustration example, and either of the right and left outline or the center line is touched with the scanner. As a matter of course, in order to make the information to be defined consistent, the dot-patterns on two visible outlines indicating the road and on the virtual center line indicating the center of the road defined in the center of the outlines may be made to be the same, and in order that different information is defined on the left-hand side, the right-hand side, and the center of the road, the dot-patterns may be made to be differed as shown in the present illustration example.

In addition, FIG. 24 (g) is a figure showing an example where the stream dot-pattern is formed on a real line indicating a road which is made up of thick lines.

By that the road name is defined on, and the associated information is made to be linked with, the code information converted from the dot code defined on the above stream dot-pattern, the grid map (a tentative name of the map using a dot-pattern) which is excellent in convenience can be provided. In addition, the stream dot-patterns are formed on prescribed positions along characters and character strings which indicate various map information such as a place name and an institution, a crossing, and the associated information is made to be linked therewith, and thereby, the detailed information on the map can be acquired easily. Furthermore, since the detailed information can be acquired, an easy-to-see map can be provided by expressing the characters and character strings which indicate the map information as briefly as possible or by deleting them.

In addition, an icon section is printed in the lower part of the map in the same way as in FIG. 23, and the icon section may be made to have the functions such as each icon of a "To top", a "To right", a "To bottom", a "To left", and a "Return" for moving the digital map displayed on the display or the like connected with the input/output device, and each icon of a "Expand", a "Standard", and "Reduce" for making the size of the digital map changed.

On the map part, not only the information with respect to the road, but also symbols which indicate the other tourist facilities or the like may be printed. On this area, the dot-patterns which means the XY coordinates corresponding to the positions of the tourist facilities are printed, and on the symbols, in addition to the XY coordinates corresponding to the positions of institutions or the like, the dot-patterns where the information or the like of the institutions are coded are superimposed and printed.

Then, an information input/output method using a drawing for information input according to the present invention will be described with reference to FIG. 25.

This embodiment is configured so that an information inputting medium is a drawing including a CAD, and when the drawing is imaged by a pen type scanner (optical read means), the imaged image data are transmitted to an information processing apparatus, and the image data are converted into a dot code by the information processing apparatus, and with reference to a link table corresponding to coordinate information and/or code information which are converted from the dot code, the information corresponding to the imaged contents is indicated on a display device (monitor) which is an output means. On the display device, electronic data installed in the information processing apparatus, and a character, a figure, a voice, a moving image, or the like which corresponds thereto are configured to be indicated. As a matter of course, in the case where the electronic data and voices or the like are not stored in the information processing apparatus, it is also possible to carry out download or the like from a server or other information processing apparatus and to display on a display.

Figure 25:
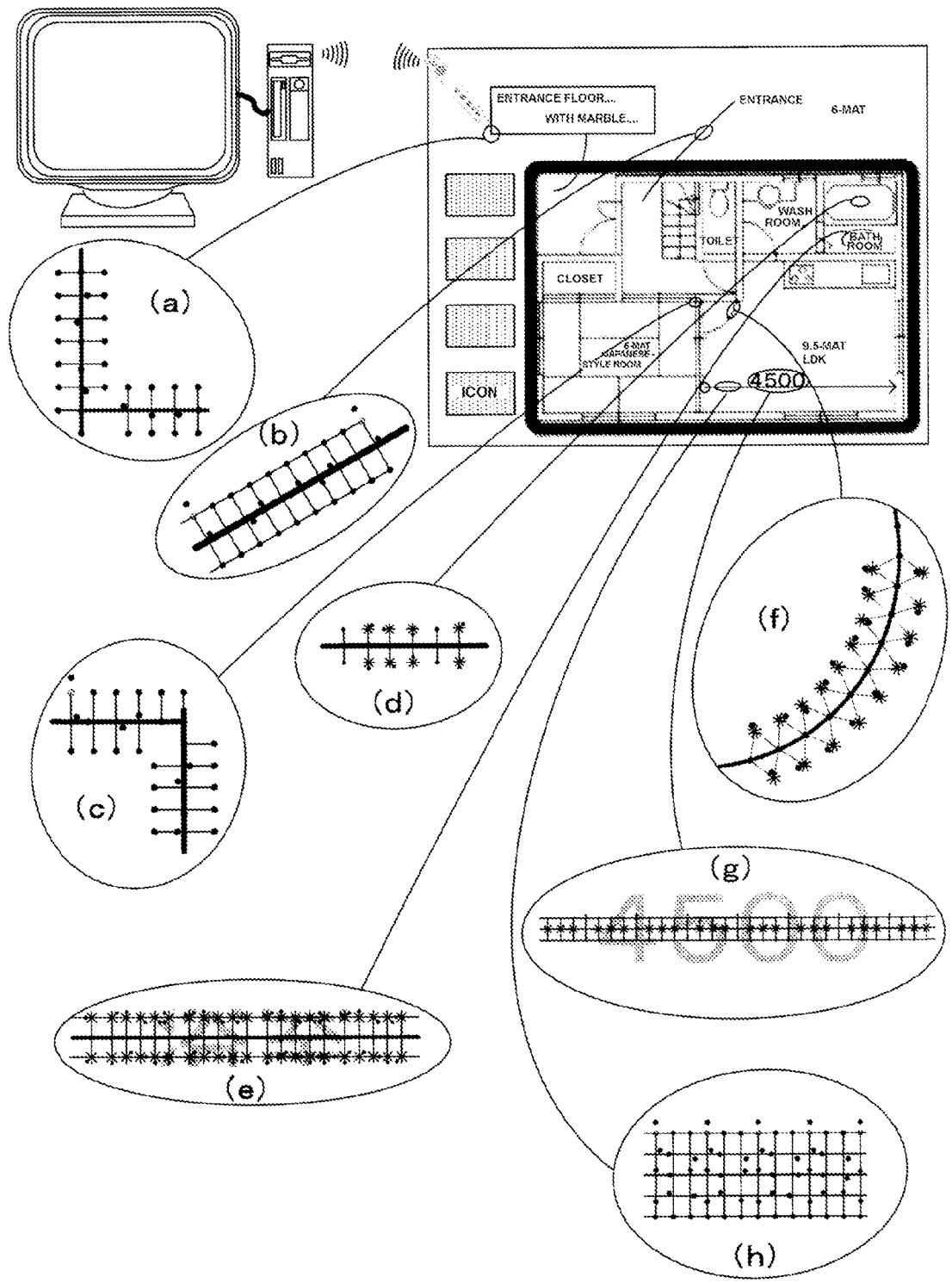
FIG. 25 is a figure describing an information input/output method using a drawing for information input.

FIG. 25 shows an example of the information input/output method using the drawing for information input according to the present invention. On the drawing, design information such as machinery, construction, construction equipment and an electric system or the like, and an icon section where icons instructing operations for performing various displays on the display device are printed, are formed in the other position on the medium.

On the area of each icon in the icon section, a dot-pattern which means a code corresponding to an operation instruction is printed, and however, the dot-pattern printed here is not limited to the stream dot-pattern mentioned above. It may be the dot-pattern having a rectangular shape used conventionally, for example, the dot-pattern where, within an area of a block where the information dot is arranged, a plurality of reference points which define a size and direction of the block are provided, and a plurality of virtual reference points defined from the reference points are arranged, and the information dot where information is defined based on the distance and direction from said virtual reference point is arranged.

On visible real lines which constitutes various design information, for example, an outline, or an indicating line, or a leading line, or a dimension line, or a character and a character string, and on a virtual center line indicating the center of an object, stream dot-patterns are printed.

In the present illustration example, on a line constituting a block where a description of a entrance floor is indicated, a stream dot-pattern (a), and on an indicating line indicating the entrance, a stream dot-pattern (b), and on a real line indicating an outline of a 6-mat Japanese-style room, a stream dot-pattern (c), and on a virtual center line where a center of a bathtub is indicated, a stream dot-pattern (d), and on a character string indicating a bath room, a stream dot-pattern (e), and on a real line expressing a door, a stream dot-pattern (f), and on a character "4500" indicating a length of a dimension line, a stream dot-pattern (g), and on a dimension line indicating a width of a 9-mat LDK, a stream dot-pattern (h), each will be printed.

As a matter of course, stream dot-patterns may be formed on characters such as a "9.5-mat LDK", a "Washroom", and a "Closet", or character strings, which are indicated in the present illustration example.

As for a method for forming of the stream dot-pattern, as the first process mentioned above, a plurality of reference dots are arranged contiguously in a line form on a part where information is wanted to be inputted and outputted on the medium surface, and as the second process, a first virtual reference line which connects the reference dots arranged in a line form is provided so as to be superimposed on an outline, or an indicating line, or a leading line, or a dimension line, or a character and a character string, or a virtual center line indicating the center of an object, or the like.

As a matter of course, reference dots are provided in the vicinity of those various lines, and only the first virtual reference line may be defined on those lines, and reference dots and the first virtual reference line are provided in both sides of various lines, and a second virtual reference line and a fourth virtual reference line may be provided on those lines.

The icon section is printed on a left part of the drawing, and printed is each icon of a "To top", a "To right", a "To bottom", a "To left", and a "Return" for scrolling electronic data, and each icon of a "Expand", a "Standard", and "Reduce" for making the size of the electronic data.

According to the present invention embodiment, if the stream dot-patterns are arranged along real lines indicated by a straight line, a polygonal line, a curved line, a solid line, various dotted lines, a thick line, the double line, or the like, the coordinate information and/or the code information can be read even at any arbitrary position using the optical read means. Furthermore, if the information (vector information) for drawing real lines are defined on the stream dot-pattern along the real lines, drawing and displaying and editing are carried out by CAD on the basis of the read coordinate information and/or code information, and the drawings can be outputted repeatedly.

In addition, if stream dot-patterns are formed along real lines which indicate an object which will be a design object, and/or along characters and character strings indicated on the drawings, and various associated information such as a type, product number, specification, a color, a pattern, a quality of material, material, fittings, a fabrication method, a constructing method, a working schedule, or the like of the object are made to be linked therewith, various information are acquired by one drawing, and a grid drawing (tentative name of a drawing using a dot-pattern) excellent in convenience can be provided.

In addition, the stream dot-pattern may have been formed on the virtual center line defined on the vicinity of various real lines which a user can identify visually, and without defining the XY information by printing dot-patterns on the whole drawing, relations between the visible information imaged by an input/output device and the information outputted will be clear.

Next, with reference to the same figure, an example of a usage state of the drawing where stream dot-patterns are formed will be described.

As shown in the figure, the drawing (medium) in the present invention is used in associated with an electronic apparatus such as a personal computer and a pen type scanner (imaging means). That is, the pen type scanner is connected to a computer with a cable communication via a USB cable or the like, and with a wireless communication such as an infrared ray communication, BLUETOOTH®. A user clicks (images) an arbitrary position, a pillar and wall, a door, a leading line, or the like on the drawing using the scanner.

On an icon printed and formed in the vicinity of the drawing, an address of CAD data is registered, and by a user clicking the icon, electronic data registered in a hard disk drive unit of a personal computer and in a server is read out, and is outputted/displayed on the display.

Besides, in FIG. 25, the scanner is connected to the computer, and however, the present invention is not limited to this, and the scanner may be made to be used in association with other telecommunications apparatuses such as a mobile phone, and a PDA (Personal Data Assistant) or the like.

A personal computer in the present example is preferable to be comprised of, with a central processing unit (CPU) as a center, a main memory (MM), a hard disk drive unit (HD) connected via a bus, a display device (DISP) as an output means, and a keyboard (KBD) as an input means.

Then a scanner as an imaging means is connected via a USB interface (USB I/F).

Besides, a printer, a loudspeaker, or the like in addition to the display device (DISP) may be connected as an output apparatus.

In addition, the bus (BUS) is connected to general-purpose networks (NW), such as the Internet, via a network interface (NW I/F), and electronic drawing data, textual information, image data, voice information, moving image information, a program, or the like are configured to be downloadable from a not-shown server.

In the hard disk (HD), application programs such as an analysis program of a dot-pattern used in the present embodiment, electronic CAD data, data of textual information, image information, voice information, moving image information, various tables, or the like are registered together with an operating system (OS).

The central processing unit (CPU) reads the application programs in the hard disk one by one via the bus (BUS) and the main memory (MM), and carries out execution processing, and at the same time, reads data to carry out output and display on the display device (DISP), and thereby, the functions described in the present embodiment will be realized.

Figure 26:
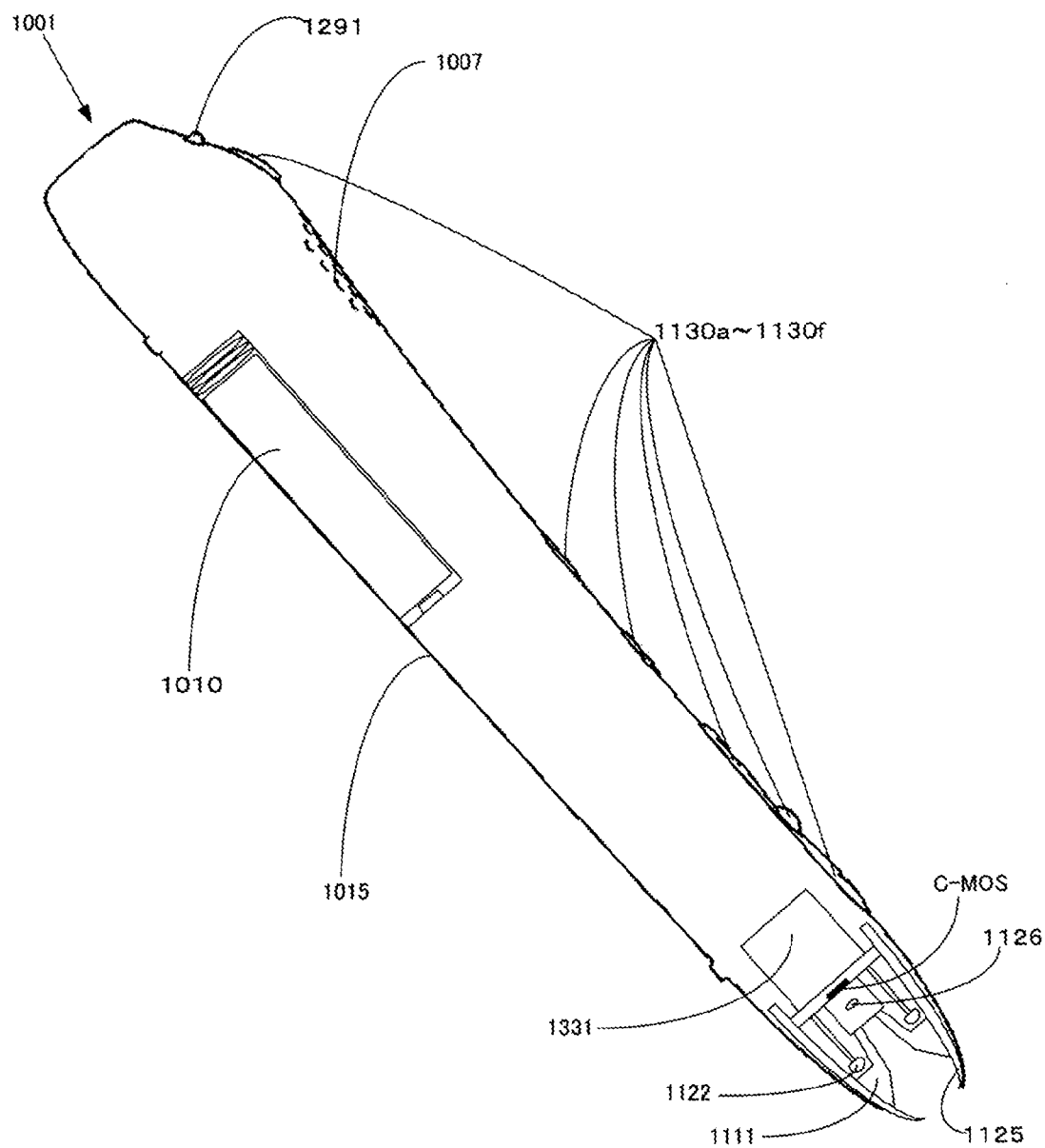
FIG. 26 is an explanatory view showing a structure of a pen type scanner.

Then, with reference to FIG. 26, an example of a structure of a pen type scanner for reading an information inputting medium according to the present invention will be described.

In this pen type scanner 1001, a battery 1010, a loudspeaker 1007, and a PCB 1331 are installed inside a case 1015. On the PCB 1331, surface mounting of the central processing unit (CPU) and the memory has been carried out. In addition, in the back end (upper left part in the figure) of the case 1015, a microphone 1291 for voice data input is built-in. Although an illustration is omitted, it may be provided with a memory cartridge detachably. In the memory cartridge, voice data or the like are configured to be registered, and since it is detachable, it is exchangeable to a ROM cartridge, a microphone unit cartridge, or the like.

On the surface of the case 1015, buttons 1130a to 1130f are provided, and a reading start and end, a recording start and end, a voice replay and stop, a volume control, or the like are configured to be able to be controlled. In accordance with prescribed operation methods (touch, slide, long push, or the like), functions of the pen type scanner can be switched by means of buttons 1130a to 1130f.

A voice can be recorded with the microphone 1291 by pushing a recording button among the buttons. The recorded voice data are recorded on the memory cartridge.

At the tip of the case 1015 (lower right edge part in the figure), a C-MOS camera unit and tapered nose 1125 are provided along a vertical axis of a medium surface when abutting on the medium surface with the case 1015 inclined by about 45 degrees. In a space inside the nose 1125, a lens 1126 of the C-MOS camera unit is attached so as to face this space, and is configured to able to image a window part of the nose 1125 tip.

A IRLED 1122 is provided in a space inside the nose 1125, and an irradiation light of the IRLED 1122 is configured to be incident in a diffuser 1111. On a wall surface of the diffuser 1111, a diffuse component (light component having an angle larger than 45 degrees against the optical axis) of the irradiation light passes through the wall surface of the diffuser 1111 and is emanated outside. Then, a travelling component (light component having an angle smaller than 45 degrees against the optical axis) of the irradiation light is reflected on the wall surface of the diffuser 1111, and travels inside the tube. As for the irradiation light, only components almost parallel to the optical axis inside the diffuser 1111 is configured to be radiated from the tip surface to the opening of the nose 1125.

In this manner, since the irradiation light is turned into a converged beam parallel to the optical axis by passing through the crank form diffuser 1111 made up from transparent resin, a homogeneous light intensity can be supplied over the whole area of the opening of the nose 1125 part. According to the present embodiment in this manner, since there is no darkness in the periphery, which arises in the case of the diffused light, the accuracy of reading of a dot-pattern part can be enhanced.

An imaged image of a dot-pattern read by the pen type scanner is analyzed by the central processing unit (CPU) in the scanner, and is converted into a coordinate value or code value, and is transmitted to the personal computer via a USB cable, an infrared ray communication, and BLUETOOTH®.

A central processing unit (CPU) of the personal computer is configured to output, with reference to a table indicating the received coordinate value or code value, electronic CAD data, textual information, image information, voice information, and moving image information which are corresponding to these, from the display device (DISP) or a loudspeaker which is not shown.

Then, an example of a three-dimensional fabrication object for information input according to the present invention will be described with reference to FIG. 27 and FIG. 28.

"Three-dimensional fabrication object" means all the modeling objects such as a three-dimensional map (not only one expressed in three dimensions, such as a mountain and valley, a canyon and building, or the like, but also cases in which the map itself are three-dimensional, are included), a building in a city model, a plastic model, a design model, and a human body model, and the "three dimensions" is what means one of which shape can be identified with a tactile sense, and also lines elevated or depressed slightly for indicating a road or railroad on a map are included in "three dimensions" mentioned here.

That is, in the curvilinear solid for information input according to the present invention, not only ones where a whole shape is formed as a curvilinear solid such as a terrestrial globe, but also the cases where each object which is formed therein and which defines the information can be identified as a curvilinear solid although the whole shape is planar are included.

Figure 27:
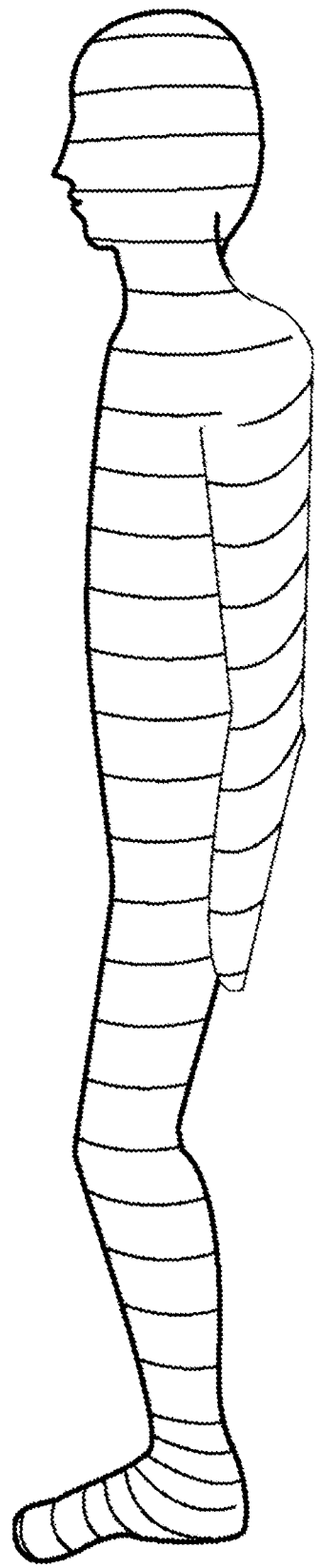
FIG. 27 is a figure showing an example of a three-dimensional fabrication object for information input.

FIG. 27 is a figure showing a curvilinear solid for information input where a three-dimensional fabrication object is constituted as a human body model.

In this embodiment, a plurality of stream dot-patterns are connected and formed in a belt-like shape, and such a belt is made to be wound in a ring shape and in a spiral fashion for every part constituting a human body or as a whole, and thereby, dot-patterns are formed on the whole curvilinear solid surface.

In the present illustration example, a human body model indicating a whole body physique is used, and however, the definition of the information is possible based on stream dot-patterns also on models expressing a cranium and cervical vertebrae, a muscle, a stomach and a liver, a heart, or the like.

When more detailed information is wanted to be acquired while a actual medium is observed, the corresponding section is touched with the scanner, and displaying on the display connected with the scanner and a voice output from a loudspeaker are possible, and it is possible to appeal to a tactile sense, a visual sense, and a hearing sense of many users including young people, and enhance a learning efficiency.

Figure 28:
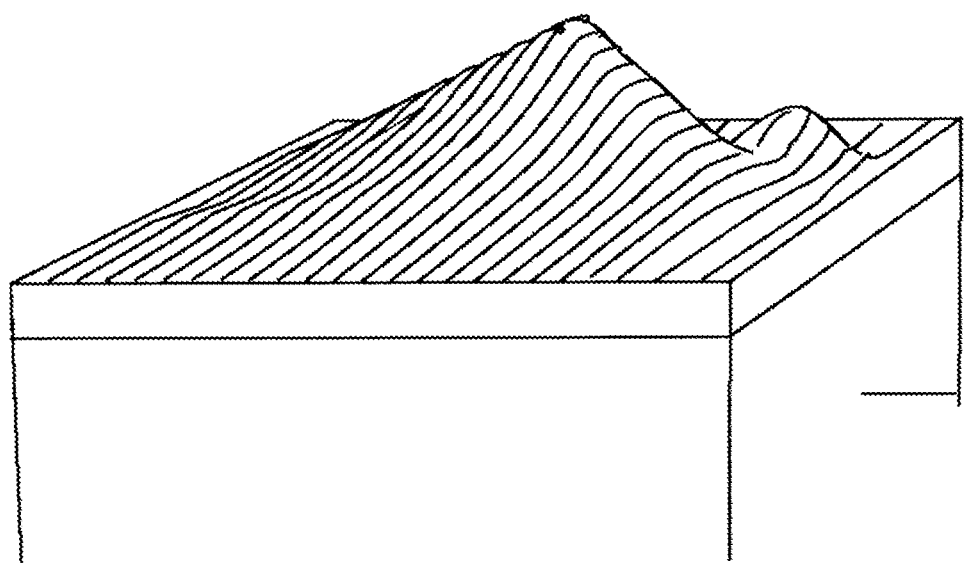
FIG. 28 is a figure showing an example of the three-dimensional fabrication object for information input.

FIG. 28 is a figure showing an example where dot-patterns are formed on a three-dimensional curved surface indicating geographical features.

In this embodiment, a plurality of stream dot-patterns are connected and formed in a belt-like shape from one end (lower part in the figure) to the other end (upper part in the figure), and a plurality of such belts are arranged in a almost parallel straight line shape, and thereby, dot-patterns are formed on the whole curvilinear solid.

In this manner, in the case of one closed sculptured surface body, if the belt-like print media where a plurality of stream dot-patterns are connected and formed in a belt-like shape are used properly and arranged without space for every part thereof in a spiral fashion, in a ring shape, or in a straight line shape, it is possible to read the coordinate information and/or code information even at any arbitrary position using the optical read means.

DESCRIPTION OF SYMBOLS

1 Dot-pattern
2 Key dot
3 Information dot
4 Reference dot
5 Virtual reference point
6 First virtual reference line
7 Second virtual reference line
8 Third virtual reference line
9 Fourth virtual reference line
12 Side dot
15 Output means
33 Optical read means
210 Terrestrial globe
230 Dot-pattern part
251 Information transmission part
266 Control information transmission part
274 Personal computer
388 Pedestal
531 Input/output device
1001 Pen type scanner
1007 Loudspeaker
1010 Battery
1015 Case
1111 Diffuser
1122 IRLED
1125 Nose
1126 Lens
1130 Button
1291 Microphone
1331 PCB

The invention claimed is:

1. A curvilinear solid for information input where a dot-pattern in which dots are arranged based on a prescribed rule is formed on the surface thereof, wherein
the dot-pattern is a stream dot-pattern comprising:
a plurality of reference dots arranged contiguously in a line form;
a first virtual reference line which connects the plurality of reference dots;
a second virtual reference line which is defined on a prescribed position from at least one of the reference dot and the first virtual reference line;
a plurality of virtual reference points provided on a prescribed position on the second virtual reference line; and
an information dot where information is defined based on a distance and a direction from the virtual reference point,
wherein the plurality of stream dot-patterns are connected and formed in a belt-like shape on a surface of the curvilinear solid, and
a dot code which is at least one of coordinate information indicating a position of a curvilinear solid and code information is defined based on a prescribed rule of the dot, and
when an arbitrary position on the curvilinear solid is imaged by an optical read means, the dot code of the imaging center is read.

2. The curvilinear solid for the information input according to claim 1, wherein said dot-pattern is formed on said curvilinear solid surface in at least one of a spiral fashion and a ring shape.

3. The curvilinear solid for the information input according to claim 1, wherein
said dot-pattern is formed on a belt-like print medium, and the belt-like print medium is pasted on said curvilinear solid surface.

4. The curvilinear solid for the information input according to claim 3, wherein said belt-like print medium is wound and pasted on said curvilinear solid surface in at least one of a spiral fashion and a ring shape.

5. The curvilinear solid for the information input according to claim 1, wherein said first virtual reference line is defined at least on a real line formed visibly on said curvilinear solid surface.

6. The curvilinear solid for the information input according to claim 1, wherein said curvilinear solid is a terrestrial globe, a star globe, or a celestial globe, and said dot-pattern defines at least one of latitude/longitude information on the terrestrial globe, the star globe, or the celestial globe in place of said coordinate information, and regional information on the terrestrial globe, the star globe, or the celestial globe as said code information.

7. The curvilinear solid for the information input according to claim 1, wherein said curvilinear solid is a body of revolution.

8. The curvilinear solid for the information input according to claim 1, wherein said curvilinear solid is a spherical body.

9. The curvilinear solid for the information input according to claim 1, wherein said curvilinear solid is a three-dimensional fabrication object such as a three-dimensional map, a sculpture, a building, and a human body model.

10. The curvilinear solid for the information input according to claim 1, wherein the first virtual reference line includes at least one of a straight line, a polygonal line, and a curved line.

11. A map for information input where a dot-pattern in which dots are arranged based on a prescribed rule is formed on the surface thereof, wherein the dot-pattern is a stream dot-pattern comprising:

a plurality of reference dots arranged contiguously in a line form;

a first virtual reference line which connects the plurality of reference dots;

a second virtual reference line which is defined on a prescribed position from at least one of the reference dot and the first virtual reference line;

a plurality of virtual reference points provided on a prescribed position on the second virtual reference line; and an information dot where information is defined based on a distance and a direction from the virtual reference point, wherein the plurality of stream dot-patterns are connected and formed in a belt-like shape on a surface of the map, and the first virtual reference line, is provided on an isopleth line which is formed on the map surface visibly, and which connects points where a value of a prescribed parameter is equal (a contour line, a constant-pressure line, an isotach, and a constant-temperature line), and a dot code which is at least one of coordinate information indicating a position on a map and code information is defined based on a prescribed rule of the dot, and when an arbitrary position on the map is imaged by an optical read means, the dot code of the imaging center is read.

12. The map for the information input according to claim 11, wherein said first virtual reference line, in place of an isopleth line which is formed on the map surface visibly, and which connects points where a value of a prescribed parameter is equal (a contour line, a constant-pressure line, an isotach, and a constant-temperature line), is provided on an outline indicating a width of a road, or a center line indicating a road, or a character and character string, which are formed visibly on said map surface, or on a virtual center line indicating a center of a road.

13. The map for the information input according to claim 11, wherein the first virtual reference line includes at least one of a straight line, a polygonal line, and a curved line.

14. A drawing for information input where a dot-pattern in which dots are arranged based on a prescribed rule is formed on the surface thereof, wherein the dot-pattern is a stream dot-pattern comprising:

a plurality of reference dots arranged contiguously in a line form;

a first virtual reference line which connects the plurality of reference dots;

a second virtual reference line which are defined on a prescribed position from at least one of the reference dot and the first virtual reference line;

a plurality of virtual reference points provided on a prescribed position on the second virtual reference line; and an information dot where information is defined based on a distance and a direction from the virtual reference point, wherein the plurality of stream dot-patterns are connected and formed in a belt-like shape on a surface of the drawing, and the first virtual reference line, is provided on a real line formed visibly on the drawing surface, and a code which is at least one of coordinate information indicating a position on a drawing and code information is defined based on a prescribed rule of the dot, and when an arbitrary position on the drawing is imaged by an optical read means, the dot code of the imaging center is read.

15. The drawing for the information input according to claim 14, wherein said first virtual reference line, in place of a real line formed visibly on the drawing surface, is provided on an outline of an object which is formed visibly on said drawing surface, or an indicating line which indicates an object, or a leading line for indicating a description of an object, or a dimension line indicating a size of an object, or a character and character string, or a virtual center line indicating a center of an object.

16. The drawing for the information input according to claim 14, wherein the first virtual reference line includes at least one of a straight line, a polygonal line, and a curved line.

* * * * *